(12) United States Patent
Larsson

(10) Patent No.: US 12,263,840 B2
(45) Date of Patent: Apr. 1, 2025

(54) LONGITUDINAL ACCELERATION CONTROL FOR AUTONOMOUS DRIVING

(71) Applicant: Aptiv Technologies AG, Schaffhausen (CH)

(72) Inventor: Oskar Larsson, Gothenburg (SE)

(73) Assignee: APTIV TECHNOLOGIES AG, Schaffhausen (CH)

(*) Notice: Subject to any disclaimer, the term of this patent is extended or adjusted under 35 U.S.C. 154(b) by 336 days.

(21) Appl. No.: 17/656,460

(22) Filed: Mar. 25, 2022

(65) Prior Publication Data

US 2022/0306100 A1 Sep. 29, 2022

(30) Foreign Application Priority Data

Mar. 26, 2021 (EP) .................................. 21165173

(51) Int. Cl.
*B60W 30/14* (2006.01)
*B60W 30/16* (2020.01)
(Continued)

(52) U.S. Cl.
CPC .......... *B60W 30/143* (2013.01); *B60W 30/16* (2013.01); *B60W 40/04* (2013.01);
(Continued)

(58) Field of Classification Search
CPC .. B60W 30/143; B60W 60/001; B60W 30/16; B60W 40/04; B60W 2554/4041;
(Continued)

(56) References Cited

U.S. PATENT DOCUMENTS 10,994,774 B2 5/2021 Bajpai et al.
2011/0015850 A1* 1/2011 Tange .................. B60W 30/12
701/116

(Continued)

FOREIGN PATENT DOCUMENTS

| DE | 102019208525 | 12/2020 |
| EP | 2853457 | 4/2015 |
| WO | 2020035728 | 2/2020 |

OTHER PUBLICATIONS

"Non-Final Office Action", U.S. Appl. No. 17/522,256, filed Aug. 10, 2023, 14 pages.

(Continued)

*Primary Examiner* — Behrang Badii
*Assistant Examiner* — Helen Li
(74) *Attorney, Agent, or Firm* — Harness, Dickey & Pierce, P.L.C.

(57) ABSTRACT

A method of setting a target longitudinal acceleration of a vehicle travelling along a road behind a leading vehicle, comprising: determining a lateral position of the leading vehicle; defining a lateral range extending from the leading vehicle and having a first subrange, a second subrange and a central subrange therebetween, wherein the lateral range increases with lateral distance of the leading vehicle from a centre of a lane in which the leading vehicle is located when the leading vehicle is changing lanes; determining a longitudinal range extending behind the leading vehicle; and setting the target longitudinal acceleration, for any longitudinal position of the host vehicle within the longitudinal range, to: a first value if a lateral position of the host vehicle is within the central subrange; and a second value greater than the first value if the lateral position is within the first or second subrange.

20 Claims, 9 Drawing Sheets

(51) Int. Cl.
*B60W 40/04* (2006.01)
*B60W 60/00* (2020.01)

(52) U.S. Cl.
CPC ..... *B60W 60/001* (2020.02); *B60W 2520/105* (2013.01); *B60W 2554/4041* (2020.02); *B60W 2554/801* (2020.02); *B60W 2720/106* (2013.01)

(58) Field of Classification Search
CPC ..... B60W 2554/801; B60W 2520/105; B60W 2720/106
USPC .......................................................... 701/96
See application file for complete search history.

(56) References Cited

U.S. PATENT DOCUMENTS

| | | |
|---|---|---|
| 2012/0179350 A1 | 7/2012 | Taneyhill et al. |
| 2015/0094924 A1* | 4/2015 | Takahashi ........... B60W 30/045 701/70 |
| 2016/0221575 A1 | 8/2016 | Posch et al. |
| 2016/0313133 A1 | 10/2016 | Zeng et al. |
| 2018/0001876 A1* | 1/2018 | Oikawa ..................... B60T 7/12 |
| 2018/0037227 A1 | 2/2018 | Dsa et al. |
| 2018/0074507 A1 | 3/2018 | Gao et al. |
| 2018/0174462 A1* | 6/2018 | Um ......................... G08G 1/166 |
| 2018/0181820 A1* | 6/2018 | Ide .......................... G08G 1/167 |
| 2019/0064839 A1* | 2/2019 | Sakai ................... G05D 1/0248 |
| 2019/0270452 A1 | 9/2019 | Katsura et al. |
| 2019/0291726 A1 | 9/2019 | Shalev-Shwartz et al. |
| 2020/0086869 A1 | 3/2020 | Oguro et al. |
| 2020/0148260 A1 | 5/2020 | Wu et al. |
| 2020/0156631 A1 | 5/2020 | Lin et al. |
| 2021/0024065 A1 | 1/2021 | Mizoguchi |
| 2021/0061271 A1* | 3/2021 | Omikawa ............ G06V 20/588 |
| 2021/0146928 A1* | 5/2021 | Clarke ..................... B60T 7/22 |
| 2021/0271988 A1 | 9/2021 | Bouton et al. |
| 2022/0032952 A1* | 2/2022 | Lienke ............... B60W 60/0011 |
| 2022/0080961 A1* | 3/2022 | Lienke .............. B60W 50/0097 |
| 2022/0250643 A1 | 8/2022 | Larsson |
| 2022/0250644 A1 | 8/2022 | Larsson |
| 2022/0332318 A1 | 10/2022 | Sakayori et al. |

OTHER PUBLICATIONS

"Notice of Allowance", U.S. Appl. No. 17/455,666, filed Jul. 17, 2023, 10 pages.
"Notice of Allowance", U.S. Appl. No. 17/522,256, filed Sep. 6, 2023, 5 pages.
"Extended European Search Report", EP Application No. 21165173. 2, Oct. 4, 2021, 5 pages.
Diehl, et al., "Radar-based Dynamic Occupancy Grid Mapping and Object Detection", Aug. 9, 2020, 6 pages.
Hoermann, et al., "Dynamic Occupancy Grid Prediction for Urban Autonomous Driving: A Deep Learning Approach with Fully Automatic Labeling", Nov. 7, 2017, 8 pages.
Larsson, "The Oskillator Artificial Force Field Highway Chauffeur", Jan. 2019, 85 pages.
Nuss, "A Random Finite Set Approach for Dynamic Occupancy Grid Maps with Real-Time Application", Sep. 10, 2016, 20 pages.
Shalev-Shwart, et al., "On a Formal Model of Safe and Scalable Self-Driving Cars", Oct. 27, 2018, 37 pages.
Steyer, "Grid-Based Environment Estimation Using Evidential Mapping and Particle Tracking", Sep. 2018, 13 pages.
Wolf, et al., "Artificial Potential Functions for Highway Driving with Collision Avoidance", May 2008, 6 pages.
"Extended European Search Report", EP Application No. 21156010. 7, Aug. 27, 2021, 6 pages.
"Extended European Search Report", EP Application No. 21155970. 3, Aug. 27, 2021, 8 pages.
Wang, "Study of Lane Change Trajectory Planning Considering of Driver Characteristics", Aug. 2018, 10 pages.

* cited by examiner

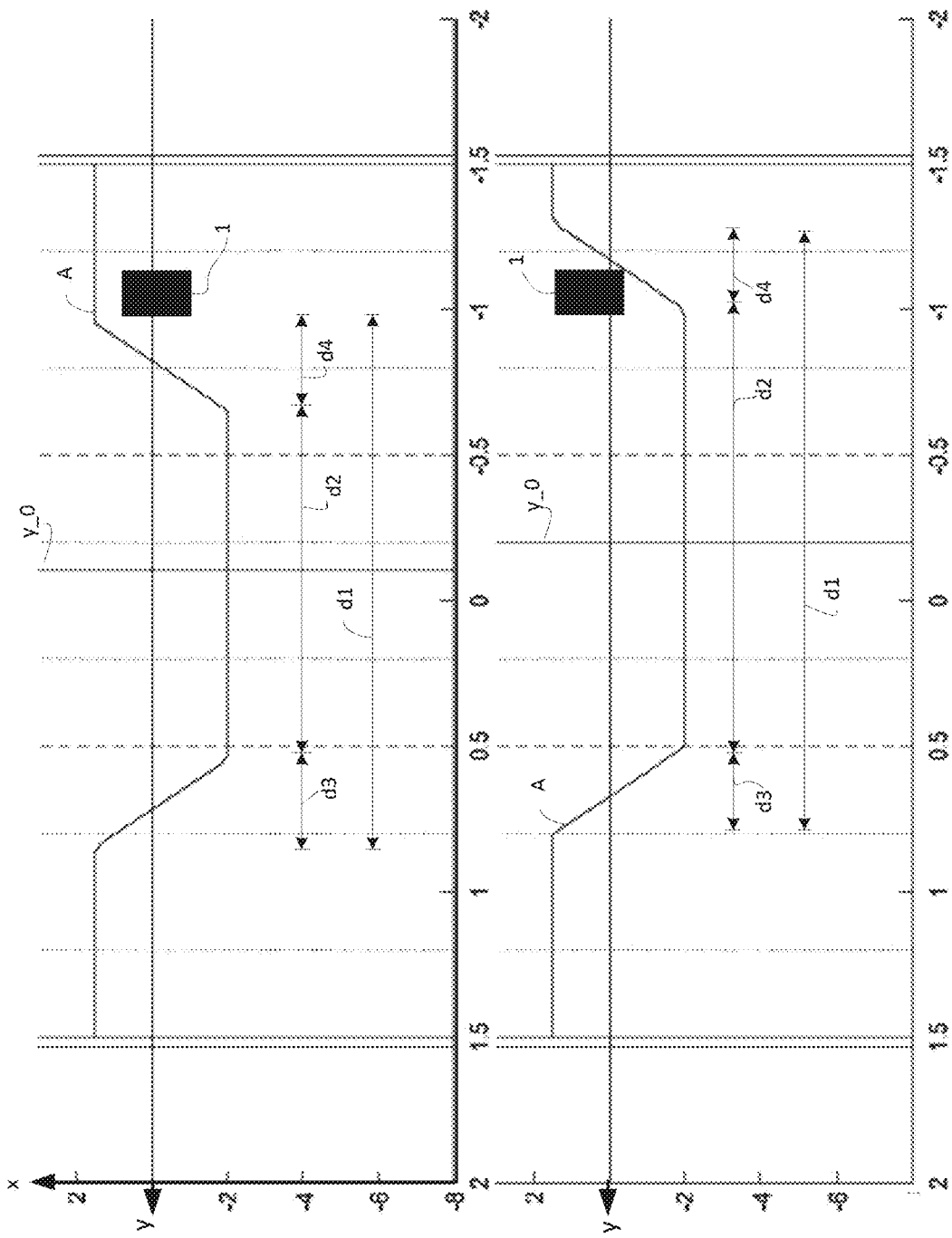

LONGITUDINAL ACCELERATION CONTROL FOR AUTONOMOUS DRIVING

CROSS-REFERENCE TO RELATED APPLICATION(S)

This application claims priority to European Patent Application Number 21165173.2, filed Mar. 26, 2021, the disclosure of which is hereby incorporated by reference in its entirety herein.

BACKGROUND

Autonomous driving functionality is a feature of modern vehicles which has been attracting increasing interest. Autonomous driving functionality may allow the driver of a host vehicle (i.e. the vehicle to be autonomously controlled) to hand over the control of both acceleration and steering of the vehicle to an autonomous driving system, which may be provided with a target velocity and headway time or more detailed information of an intended route. The autonomous driving system may then attempt to achieve the desired velocity through acceleration and steer the vehicle so as to follow a chosen lane.

An autonomous driving system may be further adapted to react appropriately to the actions of other road-users. For example, when the host vehicle approaches a slower-moving vehicle ahead of it, the autonomous driving system may decide whether to overtake the slower-moving vehicle or to slow down and to keep a desired headway distance to the vehicle ahead. The autonomous driving system may additionally switch lanes to follow a desired route. More advanced versions of the system may even predict the behaviour of other road-users to determine appropriate actions and reactions. Accordingly, autonomous driving systems are generally configured to obtain information from equipment such as radars, cameras, inertial measurement units etc., in order to collect data about the host vehicle and its environment and generate a high-level environment model describing the road and the traffic on it.

The autonomous driving system may then be further arranged to identify one or more manoeuvres that the host vehicle may perform based on the generated high-level environment, to select a manoeuvre to be performed, and to determined how this manoeuvre should be executed (in other words, to determine a trajectory for the host vehicle and appropriate control signals, such as for an acceleration and a steering angle of the host vehicle, that are required to achieve the determined trajectory), and to control the host vehicle to perform the determined manoeuvre. The two main approaches to autonomous driving algorithms are rule-based, and statistical models including those based on machine learning, cost functions, etc.

SUMMARY

The present disclosure relates to the field of autonomous driving and, in particular, techniques for setting a target longitudinal acceleration of a host vehicle relative to a road along which the host vehicle and a leading vehicle are travelling, for use in autonomous control of the host vehicle.

In one aspect, the present disclosure is directed at a computer-implemented method of setting a target longitudinal acceleration of a host vehicle relative to a road along which the host vehicle and a leading vehicle are travelling, for use in autonomous control of the host vehicle, the road comprising a plurality of lanes. The method comprises determining a lateral position of a model of the leading vehicle in a model of the road, based on a detected position of the leading vehicle. The method further comprises defining a lateral range extending from the model of the leading vehicle in the model of the road, the lateral range extending in a first lateral direction in the model of the road and a second lateral direction in the model of the road which is opposite to the first lateral direction, the lateral range comprising a first lateral subrange, a second lateral subrange and a central lateral subrange between the first lateral subrange and the second lateral subrange, wherein the lateral range is defined so as to increase by increase of at least one of the first lateral subrange and the second lateral subrange with increasing distance between the determined lateral position of the model of the leading vehicle and a lateral position in the model of the road of a centre of a lane among the plurality of lanes in which the model of the leading vehicle is located during a lane change by the model of the leading vehicle from the lane to an adjacent lane of the plurality of lanes. The method further comprises setting a longitudinal range extending from a rear of the model of the leading vehicle in a first longitudinal direction in the model of the road. The method further comprises setting the target longitudinal acceleration of the host vehicle such that, for any longitudinal position of a model of the host vehicle that is within the longitudinal range, the target longitudinal acceleration of the host vehicle is set to: a respective first acceleration value in a case where a lateral position of the model of the host vehicle in the model of the road is within the central lateral subrange; and a respective second acceleration value which is dependent on a lateral position of the model of the host vehicle in the model of the road relative to the determined lateral position of the model of the leading vehicle, and is greater than the first acceleration value in a case where the lateral position of the model of the host vehicle in the model of the road is within the first lateral subrange or the second lateral subrange.

The central lateral subrange may have a fixed width which is based on a width of a bias region within a lane among the plurality of lanes, in which bias region the host vehicle is autonomously controlled to remain while travelling in the lane.

The second acceleration value may vary from the first acceleration value, when the lateral position of the model of the host vehicle is at a furthest edge in the second lateral direction of the first lateral subrange, to a third acceleration value, when the lateral position of the model of the host vehicle is at a furthest edge in the first lateral direction of the first lateral subrange, the third acceleration value being greater than the first acceleration value. Furthermore, the second acceleration value may vary from the first acceleration value, when the lateral position of the model of the host vehicle is at a furthest edge in the first lateral direction of the second lateral subrange, to a fourth acceleration value when the lateral position of the model of the host vehicle is at a furthest edge in the second lateral direction of the second lateral subrange, the fourth acceleration value being greater than the first acceleration value.

In a case where the position of the model of the host vehicle is not in any of the first region of the model of the road defined by the longitudinal range and the central lateral subrange, a second region defined by the longitudinal range and the first lateral subrange or a third region defined by the longitudinal range and the second lateral subrange, the method comprises setting the target longitudinal acceleration of the host vehicle to a fifth acceleration value.

In the foregoing, the target longitudinal acceleration of the host vehicle may be set by scaling and offsetting a longitudinal acceleration, which has been determined by an adaptive cruise control algorithm, by an amount determined by evaluating a lateral scaling function which defines the lateral range and a variation of the factor across the lateral range such that, for any longitudinal position of a model of the host vehicle that is within the longitudinal range, the target longitudinal acceleration of the host vehicle is set to: the respective first acceleration value in the case where the lateral position of the model of the host vehicle is within the central lateral subrange; and the respective second acceleration value in the case where the lateral position of the model of the host vehicle is within the first lateral subrange or the second lateral subrange.

In some aspects, a computer program comprising instructions, which, when executed by a computer processor, cause the computer processor to perform the method according to the first aspect. The computer program may be stored on a non-transitory computer-readable storage medium or carried by a signal.

In some aspects, an apparatus for setting a target longitudinal acceleration of a host vehicle relative to a road along which the host vehicle and a leading vehicle are travelling, for use in autonomous control of the host vehicle, the road comprising a plurality of lanes. The apparatus comprises a position determination module arranged to determine a lateral position of a model of the leading vehicle in a model of the road, based on a detected position of the leading vehicle. The apparatus further comprises a lateral range defining module arranged to define a lateral range extending from the model of the leading vehicle in the model of the road, the lateral range extending in a first lateral direction in the model of the road and a second lateral direction in the model of the road which is opposite to the first lateral direction, the lateral range comprising a first lateral subrange, a second lateral subrange and a central lateral subrange between the first lateral subrange and the second lateral subrange, wherein the lateral range is defined so as to increase by increase of at least one of the first lateral subrange and the second lateral subrange with increasing distance between the determined lateral position of the model of the leading vehicle and a lateral position in the model of the road of a centre of a lane among the plurality of lanes in which the model of the leading vehicle is located during a lane change by the model of the leading vehicle from the lane to an adjacent lane of the plurality of lanes. The apparatus further comprises a longitudinal range setting module arranged to set a longitudinal range which extends from a rear of the model of the leading vehicle in a first longitudinal direction in the model of the road. The apparatus further comprises a target longitudinal acceleration setting module arranged to set the target longitudinal acceleration of the host vehicle such that, for any longitudinal position of a model of the host vehicle that is within the longitudinal range, the target longitudinal acceleration of the host vehicle is set to: a respective first acceleration value in a case where a lateral position of the model of the host vehicle in the model of the road is within the central lateral subrange; and a respective second acceleration value which is dependent on a lateral position of the model of the host vehicle in the model of the road relative to the determined lateral position of the model of the leading vehicle, and is greater than the first acceleration value in a case where the lateral position of the model of the host vehicle in the model of the road is within the first lateral subrange or within the second lateral subrange.

The central lateral subrange have a fixed width which is based on a width of a bias region within a lane among the plurality of lanes, in which bias region the host vehicle is autonomously controlled to remain while travelling in the lane.

The second acceleration value may vary from the first acceleration value, when the lateral position of the model of the host vehicle is at a furthest edge in the second lateral direction of the first lateral subrange, to a third acceleration value, when the lateral position of the model of the host vehicle is at a furthest edge in the first lateral direction of the first lateral subrange, the third acceleration value being greater than the first acceleration value. The second acceleration value may vary from the first acceleration value, when the lateral position of the model of the host vehicle is at a furthest edge in the first lateral direction of the second lateral subrange, to a fourth acceleration value when the lateral position of the model of the host vehicle is at a furthest edge in the second lateral direction of the second lateral subrange, the fourth acceleration value being greater than the first acceleration value.

In a case where the position of the model of the host vehicle is not in any of the first region of the model of the road defined by the longitudinal range and the central lateral subrange, a second region defined by the longitudinal range and the first lateral subrange or a third region defined by the longitudinal range and the second lateral subrange, the target longitudinal acceleration setting module may be arranged to set the target longitudinal acceleration of the host vehicle to a fifth acceleration value.

The target longitudinal acceleration setting module may be arranged to set the target longitudinal acceleration of the host vehicle by scaling and offsetting a longitudinal acceleration, which has been determined by an adaptive cruise control algorithm, by an amount determined by evaluating a lateral scaling function which defines the lateral range and a variation of the factor across the lateral range such that, for any longitudinal position of a model of the host vehicle that is within the longitudinal range, the target longitudinal acceleration of the host vehicle is set to: the respective first acceleration value in the case where the lateral position of the model of the host vehicle is within the central lateral subrange; and the respective second acceleration value in the case where the lateral position of the model of the host vehicle is within the first lateral subrange or the second lateral subrange.

In some aspects, a vehicle comprising a position determination apparatus for determining a position of a second vehicle relative to the vehicle, the apparatus according to the third aspect set out above, which is arranged to set a target longitudinal acceleration of the vehicle using the determined position of the second vehicle; and an automatic driver system arranged to autonomously control a speed of the vehicle using the set target longitudinal acceleration.

BRIEF DESCRIPTION OF THE DRAWINGS

Embodiments of the disclosure will now be explained in detail, by way of non-limiting example only, with reference to the accompanying figures, described below. Like reference numerals appearing in different ones of the figures can denote identical or functionally similar elements, unless indicated otherwise.

FIG. 4A illustrates an example of a lateral extent of a region extending behind a leading vehicle, in which a host vehicle's longitudinal acceleration is dependent on the leading vehicle, in accordance with a conventional technique.

FIG. 4B illustrates another example of a lateral extent of a region extending behind a leading vehicle, in which a host vehicle's longitudinal acceleration is dependent on the leading vehicle, in accordance with a conventional technique.

DETAILED DESCRIPTION

Figure 1B:
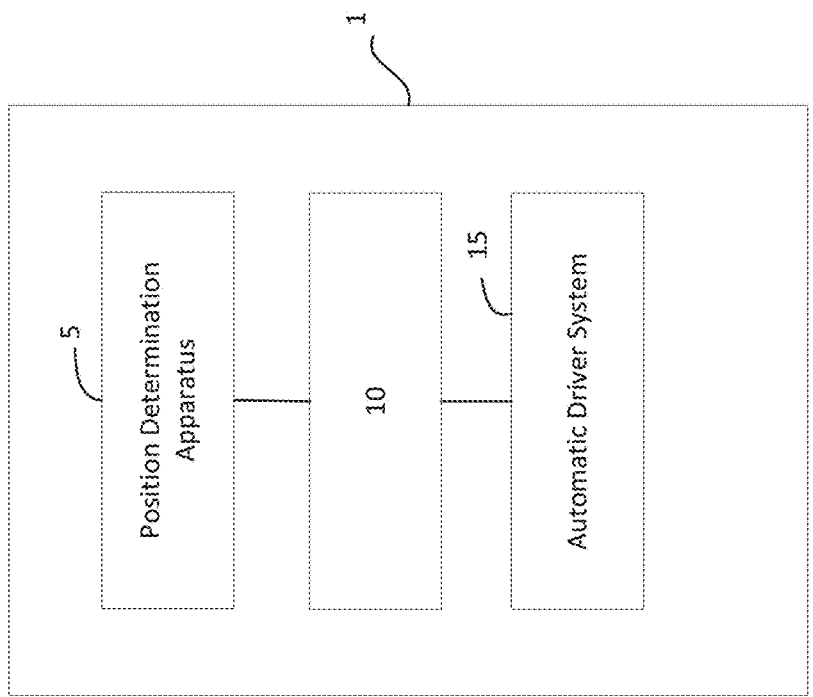
FIG. 1B is a schematic illustration of a vehicle, according to the example embodiment herein.

To be considered roadworthy, vehicles incorporating autonomous driving functionality are generally required to provide a high level of safety. While the safety's dependency on sensing equipment only can be proven with respect to likelihood, the algorithms used by autonomous driving systems for behavioural control and trajectory planning can be proven safe using formal models such as, Responsibility-Sensitive Safety (RSS), for example. RSS is a formal model describing allowed behaviour to guarantee safety.

However, various difficulties can arise both in implementing autonomous driving systems such that the determined behaviours and trajectories of the autonomously controlled vehicle are safe and resemble human-like behaviour (i.e. such that the autonomous control of the vehicle corresponds to the manual control performed by a safe human driver), and in formally proving the safety of autonomous driving systems, which must be overcome in order to provide roadworthy autonomous driving.

By way of example, while the RSS model may be sufficient to prove safety with respect to emergency manoeuvres as this model ensures that no vehicles would collide from a safe state, it does not define conditions for safe behaviour with respect to lanes of the road. In addition, the distances defined by the RSS model are based on expecting emergency manoeuvres which, while safe, may not guarantee comfortable, human-like driving.

Furthermore, autonomous driving algorithms based on statistical models can lack transparency compared to rule-based models. Rule-based models allow a prediction of what will happen in any given situation, and a decision regarding actions that are consequently to be taken, to be linked to specific rules. In contrast, a crash caused by decision made by a statistical model (such as a machine learning model) may be harder to justify, and the causes may be more difficult or impossible to determine. In addition, when generalising to an arbitrary number of vehicles in the host vehicle's environment, the behaviour in many conventional autonomous driving algorithms that are based on cost functions may have to be analysed on a case-by case basis with respect to the number of vehicles and all possible constellations of these vehicles, in order to determine safety.

A rule-based approach for behaviour and trajectory planning may involve determining a dynamic force field on the road as a function of the properties of the road and the objects on it, and using the dynamic force field to determine a trajectory of the host vehicle, as disclosed in the Master's Thesis of Oskar Larsson titled "The Oskillator, Artificial Force Field Highway Chauffeur" Chalmers University of Technology, Gothenburg, Sweden 2019 (https://hdl.handle.net/20.500.12380/300733). This approach offers improved transparency relative to autonomous driving algorithms based on statistical models, and takes into consideration the required behaviour of a host vehicle with respect to lanes of road.

More specifically, in the approach described in this Master's Thesis, a longitudinal (i.e. the direction along the road) force field is generated from three components, namely a cruise control component, a trail component and a sharp turn component, and used to determine a target longitudinal acceleration of the host vehicle. The cruise control component corresponds to a force required to cause a longitudinal velocity of the host vehicle tends towards a target longitudinal velocity and the sharp turn component corresponds to a force required to cause a longitudinal velocity of the host vehicle to be reduced before a sharp turn. The trail component corresponds to a force required to ensure that the host vehicle maintains a safe longitudinal distance to a leading vehicle (i.e. a vehicle of another road user that is ahead of the host vehicle in a direction in which the host vehicle is travelling). A safe longitudinal distance may represent the distance that the host vehicle would need to perform an emergency braking manoeuvre to avoid a collision with the leading vehicle.

In the Master's Thesis, the components and the way in which they are combined to generate the longitudinal force field are defined such that the host vehicle may travel at a target longitudinal velocity when there are no vehicles in front of it. In this scenario, the target longitudinal acceleration of the host is dependent on the cruise control component. Furthermore, when the host vehicle is approaching a leading vehicle, the longitudinal velocity of the host vehicle is smoothly reduced so that a safe longitudinal distance to the leading vehicle is maintained. In this scenario, the target longitudinal acceleration of the host is dependent on the trail component.

In particular, the trail component of the Master's Thesis is defined relative to the position of a leading vehicle so that the host vehicle's longitudinal acceleration is dependent on the trail component in a region extending behind the leading vehicle. The effect of the trail component on the host vehicle's longitudinal acceleration is gradually scaled down at the edges of the region so as to avoid a sharp jerk due to a sharp change in the target longitudinal acceleration is avoided when the host vehicle moves into a lane behind a leading vehicle.

However, even with this gradual scaling, the approach defined in this Master's Thesis may result in uncomfortable driving, such as sharp jerks, that does not resemble human-like behaviour where a vehicle of another road-user moves into a lane in which the host vehicle is driving. This uncomfortable, jerky behaviour may be exacerbated where the vehicle of the other road-user does not drive safely and, for example, cuts into the lane in which the host vehicle is driving at an unsafe longitudinal distance because the approach defined in the Master's Thesis does take sufficient account of how a host vehicle should respond when other road-users engage in unsafe driving that breaks rules defined by safety models such as the RSS or modifications thereof described in the Master's thesis.

Example embodiments described in the following may address one or more of the issues outlined above, and will now be described in detail with reference to the accompanying drawings.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

Figure 1A:
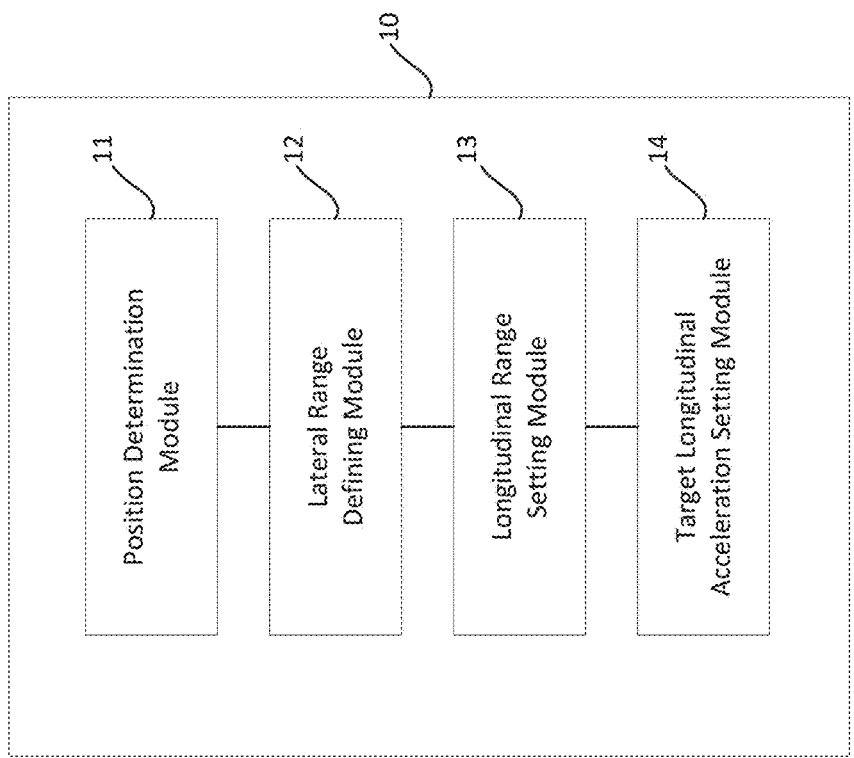
FIG. 1A is a schematic illustration of an apparatus for setting a target longitudinal acceleration of a host vehicle, according to an example embodiment herein.

FIG. 1A is a schematic illustration of an apparatus 10 for setting a target longitudinal acceleration of a host vehicle 1 (shown in FIG. 1B) relative to a road 20 (shown in FIG. 2A) along which the host vehicle 1 and a leading vehicle O (shown in FIG. 1B) are travelling, for use in autonomous control of the host vehicle 1, according to an example embodiment herein. The road 20 has a plurality of lanes 21A, 21B and 21C. That is, the target longitudinal acceleration of the host vehicle 1 set by the apparatus 10 is to be used in autonomous control of the longitudinal acceleration of the host vehicle 1, for example, by autonomous driver system 15 shown in FIG. 1B.

As shown in FIG. 1A, the apparatus 10 includes a position determination module 11, a lateral range defining module 12, a longitudinal range setting module 13 and a target longitudinal acceleration setting module 14.

The position determination module 11 is arranged to determine a lateral position of a model of the leading vehicle O in a model of the road 20, based on a detected position of the leading vehicle O. The leading vehicle O may, as in the present example embodiment, be a vehicle (e.g. car) of another road user which is ahead of the host vehicle 1 in a direction in which the host vehicle 1 is travelling. The leading vehicle O may be directly in front of the host 1, i.e. in a same lane as the host vehicle 1 or in a different lane to the host vehicle 1.

Figure 2A:
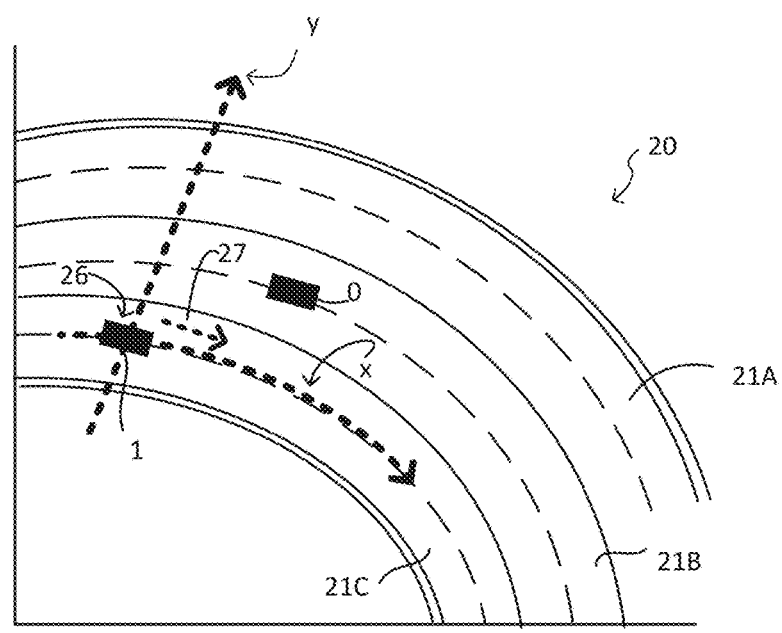
FIG. 2A illustrates an example of a model of a road defined in a lane coordinate system.

FIG. 2A illustrates an example of a model of a road 20 along which the host vehicle 1 and the leading vehicle O may travel. The model of the road 20 is defined in a lane coordinate system.

In the example of FIG. 2A, the road 20 has three lanes 21A, 21B and 21C. The lanes of the road 20 may, as in the present example, have the same width. One of the lanes 21A, 21B, 21C may serve as a so-called "fast lane" and another of the lanes 21A, 21B, 21C may serve as a so-called "slow lane". In the present example, the left-most lane 21A serves as the fast lane, and the right-most lane 21C serves as the slow lane.

The exemplary model of the road 20 shown in FIG. 2A illustrates the road 20 and the traffic thereon at an instant in time. In the exemplary model of the road 20, the host vehicle 1 is located at a position 26 in the right-most lane 21C and is travelling in the direction indicated by arrow 27. The leading vehicle O of another road-user is travelling in the middle lane 21B and in the same direction as the host vehicle 1.

The lateral position of the leading vehicle O in the model of the road 20 may, as in the present example, be defined with respect to a centre of a bounding box of a model of the leading vehicle O in the model of the road 20. By way of alternative, the position of the leading vehicle O may be defined in relation to any other predefined reference point of the model of the leading vehicle O such as, for example, a predetermined corner of the bounding box, a centre of mass of the model of the leading vehicle O, a centroid of the model of the leading vehicle O, etc. A lateral and longitudinal position of the host vehicle 1 and a longitudinal of the leading vehicle O in the model of the road 20 may, as in the present example embodiment, be defined in a similar manner.

Although the model of the road 20 shown in FIG. 2A has three lanes, the road 20 on which the model is based may have one lane, two lanes or four or more lanes, and a corresponding number of lanes may be included in the model of the road 20. As a further alternative, while a single leading vehicle O is shown in the model of the road 20 illustrated in FIG. 2A, any suitable number of model vehicles other than the host vehicle 1 may be included in a model of a road 20 and, optionally, the number of additional model vehicles may depend on the traffic on the road at a given time. By way of example, the number of additional model vehicles to be included in the model of the road may be determined based on information from equipment such as radars, cameras, inertial measurement units etc. that collect data about the host vehicle 1 and its environment in order to generate a high-level environment model describing the road 20 and the traffic on it, i.e. the model of the road 20.

In the example of FIG. 2A, the model of the road 20 is defined in a lane coordinate system. The lane coordinate system may be a two-dimensional curvilinear coordinate system adapted to reflect the road 20 on which the model is based. In particular, a curvilinear coordinate system constituting the lane coordinate system may have two axes, namely a longitudinal axis or x-axis (indicated by reference sign x in FIG. 2A), which extends in a longitudinal direction along the road, and a lateral axis or y-axis (indicated by reference sign y in FIG. 2A), which extends across the road. The x-axis is always parallel to the lanes of the road and the y-axis is orthogonal to the x-axis at every value of x. The lane coordinate system and thus the model of the road 20 may, however, be defined in other ways, for example using a Cartesian coordinate system.

More generally, the lane coordinate system and the model of the road 20 may be defined in any suitable way such that the apparatus 10 is provided with information on the host vehicle 1, the leading vehicle O, the curvature of the road 20, the number and width of lanes 21A, 21B, 21C and the any additional vehicles on the road 20.

Additionally, the host vehicle 1 and leading vehicle O may be defined in the lane coordinate system in any suitable way. By way of example, the host vehicle 1 and leading vehicle O may, as in the present example embodiment, each be represented as an object having dynamic properties as described above and defined in the lane coordinate system. Alternatively, the host vehicle 1 and leading vehicle O may be represented as one or more cells of a grid having dynamic properties defined in the lane coordinate system.

The host vehicle 1 may, as in the present example embodiment, be defined by the following dynamic properties:
- l—longitudinal extent (length)
- w—lateral extent (width)
- y—lateral position
- $v_x$—longitudinal velocity
- $v_y$—lateral velocity
- $a_x$—longitudinal acceleration
- $a_y$—lateral acceleration Correspondingly, the leading vehicle O may, as in the present example embodiment, be defined by the following dynamic properties (where the subscript i denotes that the leading vehicle O may be the $i^{th}$ vehicle among one or more vehicles defined in the model of the road 20 in addition to the host vehicle 1):
- $l_i$—longitudinal extent (length)
- $w_i$—lateral extent (width)
- $x_i$—longitudinal position
- $y_i$—lateral position
- $v_{x,i}$—longitudinal velocity
- $v_{y,i}$—lateral velocity
- $a_{x,i}$—longitudinal acceleration
- $a_{y,i}$—lateral acceleration In the example lane coordinate system shown in FIG. 2A, the x-axis of the lane coordinate system is increasing in the direction of forward travel of the host vehicle 1 and the y-axis of the lane coordinate system is increasing in the direction of the left-most lane 21A from the middle of the model of the road 20. However, the lane coordinate system may be orientated in any other suitable way. By way of example, the x-axis of the lane coordinate system may be increasing in a direction opposite to the direction of forward travel of the host vehicle 1 and/or the y-axis may be increasing in a direction of the right-most lane from the middle of the model of road 20.

Furthermore, the lane coordinate system may, as in the example of FIG. 2A, be defined such that x=0 denotes the longitudinal position of the host vehicle 1 in the x-axis and y=0 denotes the centre of a lane of the road 20. In particular, the lane coordinate system may, as in the example of FIG. 2A, be defined such that y=0 denotes the centre of the centre lane 21B. However, the lane coordinate system may be defined in any other suitable manner, e.g. y=0 may be selected denote the centre of any lane among the plurality of lanes of the model of road 20.

Figure 2B:
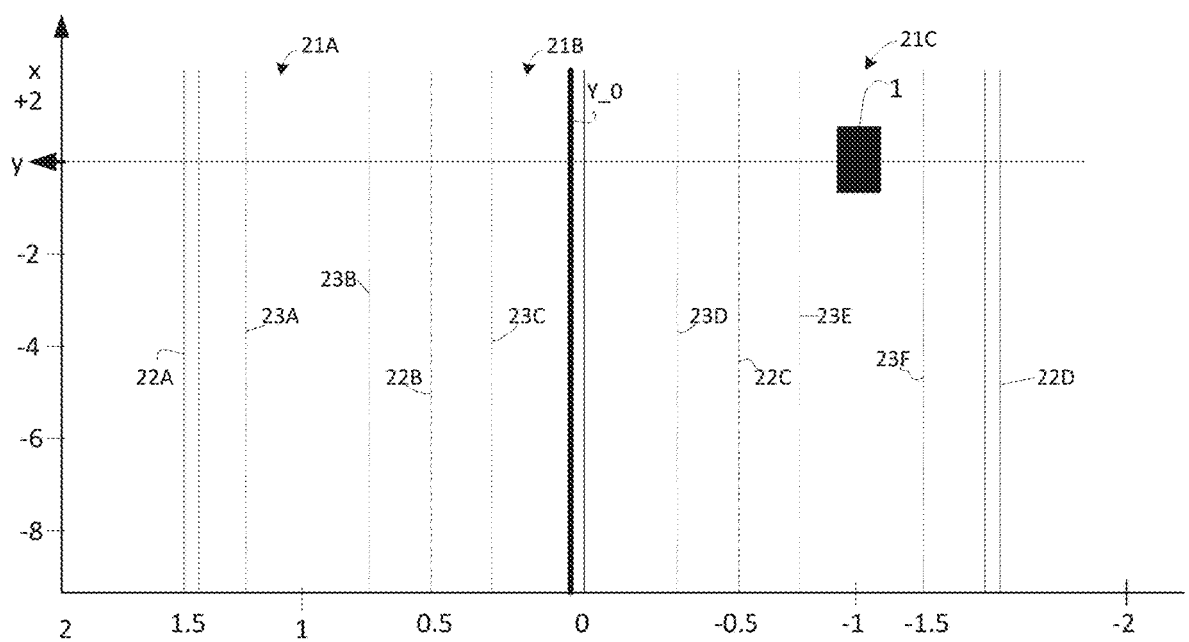
FIG. 2B illustrates a section of the model of the road 20 in a vicinity of the host vehicle 1, where the road is approximately linear.

FIG. 2B illustrates a section of the model of the road 20 in the vicinity of the host vehicle 1, where the road is approximately linear.

The lanes 21A, 21B, 21C may, as in the example of FIG. 2B, be defined using a plurality of lane boundaries 22A, 22B, 22C, 22D. Lane boundaries 22A and 22D correspond to respective boundaries of the road 20.

As shown in FIG. 2B, the y-axis may, as in the example of FIGS. 2A and 2B, be scaled to the lane width such that each increment or decrement of 1 in the y-axis represents the width of one lane, such that y=1 denotes the centre of the left-most lane 21A and y=−1 denotes the centre of the right-most lane 21C and y={−1.5, −0.5, 0.5, 1.5} denote the lane boundaries 22A, 22B, 22C, 22D, respectively. Alternatively, the y-axis may be scaled in any other suitable manner, e.g. such that each increment or decrement of 1 in the y-axis represents half the width of one lane so that both the lane centres and so lane boundaries have integer values, or the y-axis may not be scaled.

A respective bias region may, as in the example of FIG. 2B, extend along each of the lanes 21A, 21B, 21C in the longitudinal direction (x-axis). Each bias region may, as in the example shown in FIG. 2B, be defined by a lateral offset $\Delta y_{bias}$ from the centre of the corresponding lane in the lateral direction (y-axis) such that the bias region of lane 21A is the region of the lane between edges 23A and 23B, the bias region of lane 21B is the region of the lane between edges 23C and 23D, the bias region of lane 21C is the region of the lane between edges 23E and 23F.

The value of the lateral offset $\Delta y_{bias}$ may be selected so as to represent an acceptable deviation from the lane centre (bias leeway) that a vehicle may have while still being considered to remain fully (safely) within the lane. In particular, in order to ensure safety, the host vehicle 1 should stay near the centre of a lane in which it is travelling unless the host vehicle 1 is switching lanes, and the lateral offset $\Delta y_{bias}$ may be selected so as to represent the maximal lateral deviation from a centre of the lane the host vehicle 1 may appropriately have when not switching lanes.

The determined lateral position of the model of the leading vehicle O is indicated by line having a reference sign Y_O in FIG. 2B. The leading vehicle O is not shown in FIG. 2B and is located at some position ahead of the host vehicle 1 in the positive y-direction.

Referring again to FIG. 1A, the lateral range defining module 12 is arranged to define a lateral range extending from the model of the leading vehicle O, in the model of the road 20. The lateral range extends in a first lateral direction in the model of the road 20 and a second lateral direction in the model of the road 20 which is opposite to the first lateral direction.

The lateral range has a first lateral subrange, a second lateral subrange and a central lateral subrange between the first lateral subrange and the second lateral subrange. The lateral range is defined so as to increase by increase of the first lateral subrange and/or the second lateral subrange with an increasing lateral distance between the determined lateral position of the model of the leading vehicle O and a lateral position in the model of the road 20 of a centre of a lane 21B among the plurality of lanes in which the model of the leading vehicle O is located, this increase in the lateral range occurring during a lane change by the model of the leading vehicle (O) from the lane to an adjacent lane of the plurality of lanes. The central lateral subrange may be variable (for example, as a function of a longitudinal distance between the model of the host vehicle 1 and the model of the leading vehicle 1 along the model of the road 20) or it may be fixed (constant), as in the present example embodiment.

The lateral range may, as in the present example embodiment, vary with the aforementioned lateral distance and the lateral velocity $v_y$ of the leading vehicle O such that, when the lateral velocity $v_y$ of the leading vehicle O is smaller than or equal to a threshold lateral velocity $v_\mu$ discussed below, and the leading vehicle O is not changing lane but remains within the bias region of a lane it is following, the lateral range decreases as the aforementioned distance increases. As a result, any lateral oscillation of the leading vehicle O whilst remaining within the lane may have less effect on the braking of the host vehicle 1 when the host vehicle 1 is travelling in an adjacent lane. However, when the leading vehicle O crosses an edge of the biasing region of the lane it has been travelling in during a lane change, whilst $v_y$ is smaller than $v_\mu$, the lateral range then increases as the aforementioned distance increases. On the other hand, when the lateral velocity $v_y$ of the leading vehicle O is greater than or equal to a second threshold lateral velocity $v_{min,switch}$, which is a minimum lateral velocity to be used during lane switching or that is indicative of lane switching, then the lateral range increases as the aforementioned distance increases while the model of the leading vehicle O is positioned inside the biasing region, and the lateral range decreases as the aforementioned distance increases while the model of the leading vehicle O is outside the biasing region. An example of lateral scaling function used in the present example embodiment, which defines this behaviour of the lateral range, is discussed further below.

The lateral range may, as in the present example embodiment, be defined such that the first lateral subrange and the second lateral subrange are independent of a distance along the longitudinal direction between the model of the leading vehicle O and the model of the host vehicle 1.

By way of example, the first lateral direction may, as in the present example embodiment, be a positive y-direction (left in the example of FIG. 2B) and the second lateral direction may, as in the present example embodiment, be a negative y-direction (right in the example of FIG. 2B).

The lateral range may, as in the present example embodiment, increase with the distance (along the lateral direction) between the determined lateral position of the model of the leading vehicle O and the lateral position in the model of the road 20 of the centre of the lane 21B among the plurality of lanes in which the model of the leading vehicle O is located, in that an extent (width) of the lateral range increases as the distance between the determined lateral position and the lateral position in the model of the road 20 of the centre of the lane 21B in which the model of the leading vehicle O increases during a lane change by the model of the leading vehicle (O) from the lane to an adjacent lane.

The central lateral subrange may, as in the present example embodiment, have a fixed (constant) extent (width) and may therefore be independent of the position of the leading vehicle O relative to the centre of the lane 21B in which it is travelling.

The longitudinal range setting module 13 is arranged to set a longitudinal range, which extends from a rear of the model of the leading vehicle O, in a first longitudinal direction in the model of the road 20.

By way of example, the first longitudinal direction may, as in the present example embodiment, be a direction opposite to the direction of travel of the leading vehicle O. Thus, in the example of FIG. 2A, the first longitudinal direction may be a negative x-direction, i.e. a direction opposite to the arrow 27 in FIG. 2A.

The target longitudinal acceleration setting module 14 is arranged to set the target longitudinal acceleration of the host vehicle 1 during a lane change of the leading vehicle 1 such that, for any longitudinal position of the model of the host vehicle 1 that is within the longitudinal range, the target longitudinal acceleration of the host vehicle 1 is set to:

(i) a respective first acceleration value in a case where a lateral position of the model of the host vehicle 1 in the model of the road 20 is within the central lateral subrange; and (ii) a respective second acceleration value, which is dependent on a lateral position of the model of the host vehicle 1 in the model of the road 20 relative to the determined lateral position of the model of the leading vehicle 1, and is greater than the first acceleration value, in a case where the lateral position of the model of the host vehicle 1 in the model of the road 20 is within the first lateral subrange or within the second lateral subrange.

As will be discussed in more detail below, the first acceleration value may be a deceleration value, that is, a value indicative of an acceleration in a longitudinal direction opposite to the direction of travel of the host vehicle 1 (e.g. the negative x-direction opposite to the direction of arrow 27 in FIGS. 2A and 2B). Correspondingly, the second acceleration value may be a deceleration value (a value indicative of an acceleration in a longitudinal direction opposite to the direction of travel of the host vehicle 1) or may be indicative of an acceleration in the direction of travel of the host vehicle 1. The first acceleration value may alternatively be indicative of an acceleration in the direction of travel of the host vehicle 1 (e.g. the positive x-direction indicated by the arrow 27 in FIGS. 2A and 2B), for example in a case where the leading vehicle O is travelling faster than the host vehicle 1 or where the longitudinal separation of the two vehicles is large enough. Correspondingly, the second acceleration value may be a value indicative of an acceleration in the direction of travel of the host vehicle 1 or may be indicative of a deceleration in the direction of travel of the host vehicle 1.

Figure 3:
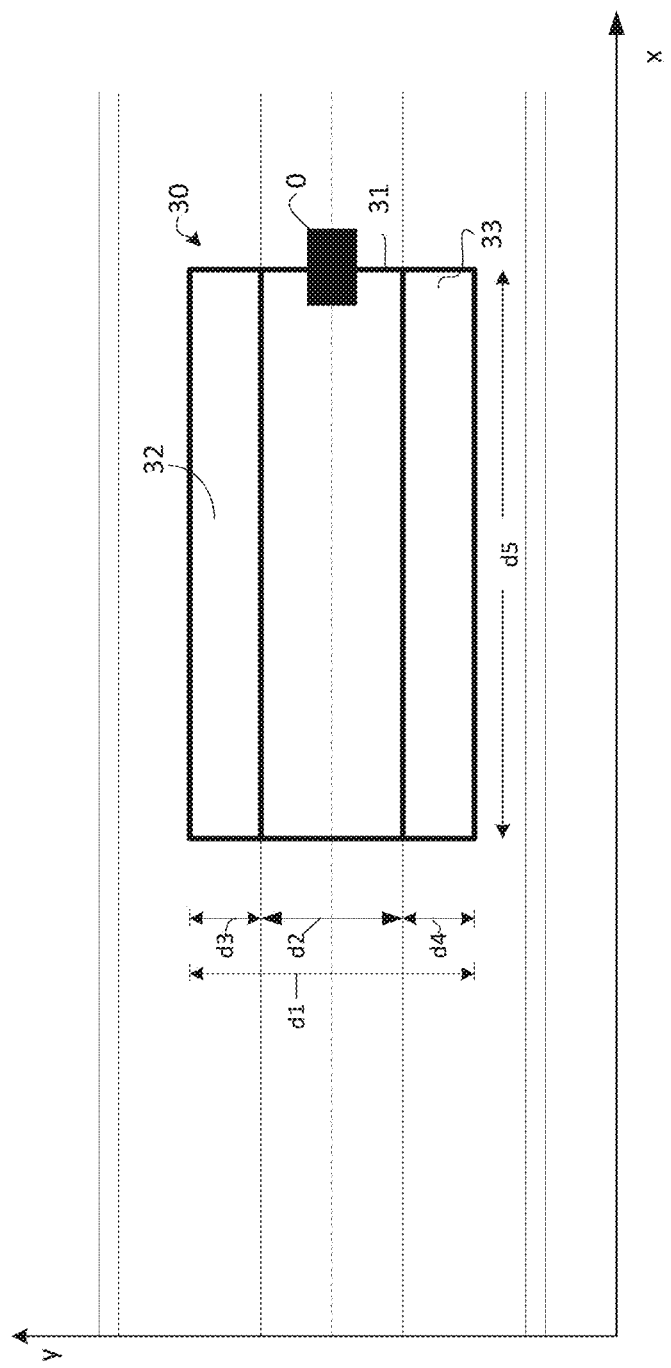
FIG. 3 illustrates an example of a first region, a second region and a third region defined in the example embodiment herein.

FIG. 3 illustrates an example of the first region 31, the second region 32 and the third region 33 defined in accordance with an example embodiment herein, which are depicted in a coordinate system of the road.

In the example shown in FIG. 3, the lateral range defined by the lateral range defining module is indicated by distance d1, which represents the lateral extent of the lateral range. The central lateral subrange is indicated by distance d2, which represents the lateral extent of the central lateral subrange. The first lateral subrange is indicated by distance d3, which represents the lateral extent of the first lateral subrange. The second lateral subrange is indicated by distance d4, which represents the lateral extent of the second lateral subrange.

In the example shown in FIG. 3, the longitudinal range set by the longitudinal range setting module 13 is indicated by distance d5, which represents the longitudinal extent of the longitudinal range.

As shown in FIG. 3, the first region 31 of the model of the road 20 may, as in the present example embodiment, be defined by the longitudinal range and the central lateral subrange in that the first region has a lateral extent d2 and a longitudinal extent d5. Correspondingly, second region 32 of the model of the road 20 may, as in the present example embodiment, be defined by the longitudinal range and the first lateral subrange in that the second region has a lateral extent d3 and a longitudinal extent d5. Correspondingly, third region 33 of the model of the road 20 may, as in the present example embodiment, be defined by the longitudinal range and the second lateral subrange in that the third region has a lateral extent d4 and a longitudinal extent d5.

The lateral extent d1 of the lateral range increases with increasing distance between the determined lateral position of the model of the leading vehicle O and a lateral position in the model of the road 20 of a centre of a lane among the plurality of lanes in which the model of the leading vehicle O is located, during a lane change by the model of the leading vehicle O from the lane to an adjacent lane. In the example shown in FIG. 3, the leading vehicle O is located at a centre of the lane. In the present example embodiment, in a case where the lateral velocity $v_y$ of the model of the leading vehicle O is less than or equal to $v_\mu$, the lateral range d1 is constant for all lateral positions of the leading vehicle O that are within the bias region of the lane in which the model of the leading vehicle O is travelling. As the model of the leading vehicle O moves laterally within the bias region (owing to steering corrections necessary to keep the vehicle within the lane) at such low velocity, d3 will decrease as d4 increases, and vice versa, so as to keep the lateral range d1 constant.

The central lateral subrange may, as in the example of FIG. 3, be defined so as to have a fixed width in that, regardless of the position of the leading vehicle O relative to the centre of the lane in which it is travelling, the lateral extent d2 does not change.

Accordingly, as will be understood from the present disclosure, as the lateral range increases, the lateral extent d3 of the first lateral subrange and/or the lateral extent d4 of the second lateral subrange increase(s) while the central lateral subrange has a fixed width.

FIGS. 4A and 4B illustrate examples of the lateral extent of a region extending behind a leading vehicle (not shown), in which a host vehicle's longitudinal acceleration is dependent on the leading vehicle, in accordance with a technique described in the Master's Thesis of Oskar Larsson cited above. More specifically, FIGS. 4A and 4B illustrate an example of the lateral extent of the region extending behind a leading vehicle in which a host vehicle's longitudinal acceleration is dependent on the trail component described in the Master's Thesis.

In the example of FIGS. 4A and 4B, lateral extents d1, d2, d3 and d4 are used for ease of comparison only, and do not indicate that corresponding extents are considered in this technique.

In the example of FIGS. 4A and 4B, the leading vehicle, which is assumed to be at some location ahead of the host vehicle 1, is moving in the negative y-direction in order to switch into the right-most lane, in which the host vehicle 1 is driving. In particular, FIG. 4A illustrates a first instant in time, at which the lateral position y_o of the leading vehicle is displaced from the centre of the centre lane, i.e. y=0. FIG. 4B illustrates a second instant in time, which is later than the first instant in time, when the lateral position y_o of the leading vehicle has reached the edge of the bias region of the lane which it is leaving.

As shown in FIGS. 4A and 4B, in accordance with the technique described in the Master's Thesis of Oskar Larsson, the lateral extent d1 of the region extending behind a leading vehicle, in which a host vehicle's longitudinal acceleration is dependent on the leading vehicle, increases as the lateral position y_o of the leading vehicle moves away from the centre of the lane in which it was travelling in preparation for the host vehicle switching into the lane in which the host vehicle is travelling.

The line indicated by reference sign A in FIGS. 4A and 4B is indicative of an allowable target longitudinal acceleration of the host vehicle 1. More specifically, in the example of FIGS. 4A and 4B, for lateral positions at which the line A is greater than 0 (i.e. greater than the longitudinal position of the host vehicle 1 in the x-axis), longitudinal acceleration in the direction of travel of the host vehicle 1 is allowable. For lateral positions at which the line A is less than 0 (i.e. less than the longitudinal position of the host vehicle 1 in the x-axis), longitudinal acceleration in the direction of travel of the host vehicle 1 is not allowable such that the host vehicle 1 is expected to decelerate (i.e. accelerate in a negative longitudinal direction relative to the direction of travel of the host vehicle) in order to maintain a safe longitudinal distance from the leading vehicle.

As shown in FIGS. 4A and 4B, outside the lateral extent d1 of the region extending behind a leading vehicle, in which a host vehicle's longitudinal acceleration is dependent on the leading vehicle, the allowable target longitudinal acceleration has a constant value. For lateral positions within the lateral extent d1, the allowable acceleration has a minimum value for lateral positions within lateral extent d2 and the allowable acceleration gradually increases (preferably linearly, so as to ramp up) from this minimum value towards the constant acceleration outside the lateral extent d1 for lateral positions within lateral extents d3 and d4.

As shown in FIGS. 4A and 4B, as the leading vehicle moves into the lane in which the host vehicle 1 is travelling, the lateral extent d2 (and thus the entire lateral extent d1 of the region extending behind a leading vehicle, in which a host vehicle's longitudinal acceleration is dependent on the leading vehicle) increases, while lateral extents d3 and d4 both remain constant. The lateral extent d1 also moves with the lateral position y_o of the leading vehicle.

As such, the change in position of the lateral position y_o of the leading vehicle from FIG. 4A to FIG. 4B results in a much greater change in position of the edges of the lateral extent d1. More specifically, as shown in FIG. 4A, the lateral position of the host vehicle 1 is outside the lateral extent d1 and, as such, the host vehicle 1 may longitudinally accelerate in its direction of travel. In contrast, in FIG. 4B, the lateral position of the host vehicle is within the lateral range d4 and the allowable target longitudinal acceleration of the host vehicle is close to the minimum value.

The time required for the lateral position y_o of the leading vehicle to move as shown in FIGS. 4A and 4B may be relatively short (e.g. of the order of 0.1 s). It is apparent that the technique described in the Master's Thesis of Oskar Larsson would require that, in this brief period of time, the target longitudinal acceleration of the host vehicle 1 jumps from an acceleration to a deceleration. This sudden change in allowable target longitudinal acceleration may, in turn, result in uncomfortable driving, such as sharp jerks, that does not resemble human-like behaviour. This uncomfortable, jerky behaviour may be exacerbated where the leading vehicle does not drive safely and, for example, cuts into the lane in which the host vehicle 1 is driving, at an unsafe longitudinal distance in front of the host vehicle 1.

In contrast, FIGS. 4C to 4G illustrate an example of how lateral range determined in accordance with an example embodiment herein changes as the leading vehicle O moves from an adjacent lane into the lane in which the host vehicle 1 is driving. In the example of FIGS. 4C to 4G, the line indicated by reference sign A is indicative of the target longitudinal acceleration of the host vehicle 1 set by the apparatus 10 of FIG. 1A.

As shown in FIGS. 4C to 4G, as the lateral position y_o of the leading vehicle O moves in the negative y-direction and away from the centre of the lane in which it is travelling, the lateral extent d1 of the lateral range increases. More specifically, the lateral extent d3 of the first lateral subrange and the lateral extent d4 of the second lateral subrange increase while the central lateral subrange has a fixed width (extent d2).

Accordingly, as is apparent from FIGS. 4C to 4G, the target longitudinal acceleration of the host vehicle 1 set by the apparatus 10 of FIG. 1A may change more gradually than the allowable target acceleration determined by the technique described in the Master's Thesis of Oskar Larsson because the increase in the lateral range is implemented by an increase in the extent of the first lateral subrange and/or the second lateral subrange. As such, it may be possible to avoid uncomfortable driving, such as sharp jerks, that does not resemble human-like behaviour.

Figure 4C:
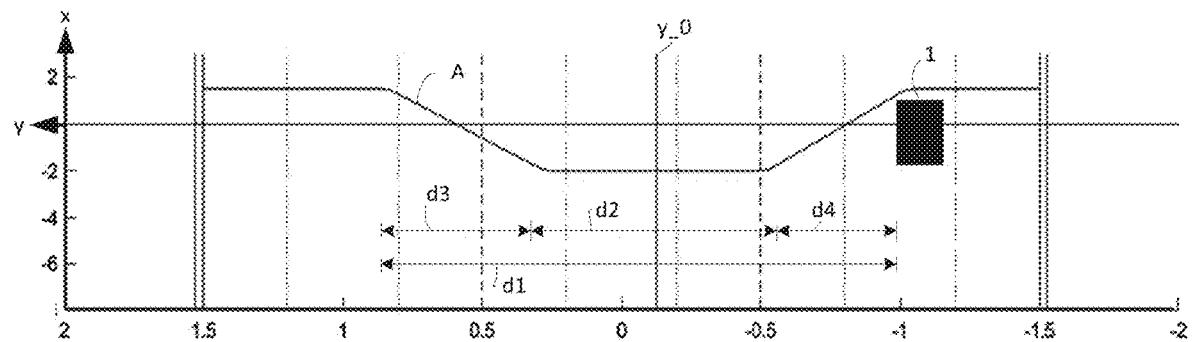
FIGS. 4C, 4D, 4E, 4F, and 4G illustrate an example of how lateral range determined in accordance with an example embodiment herein changes as the leading vehicle moves from an adjacent lane into the lane in which the host vehicle is driving.
Figure 4D:
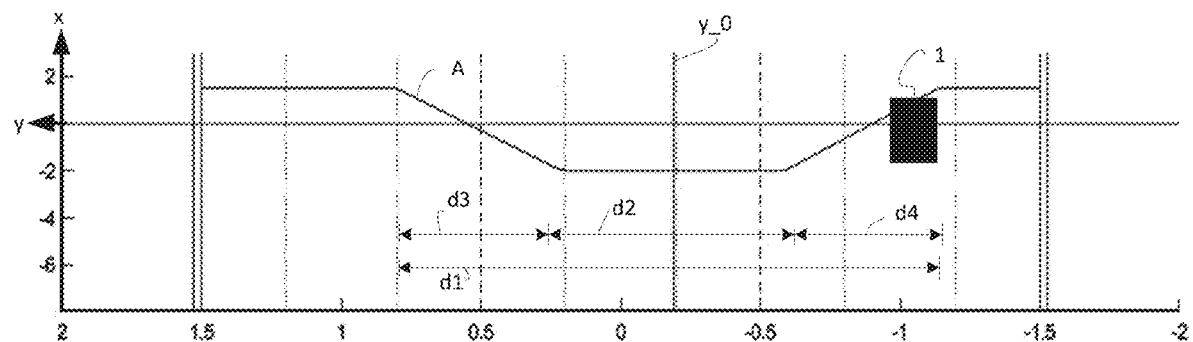
Figure 4E:
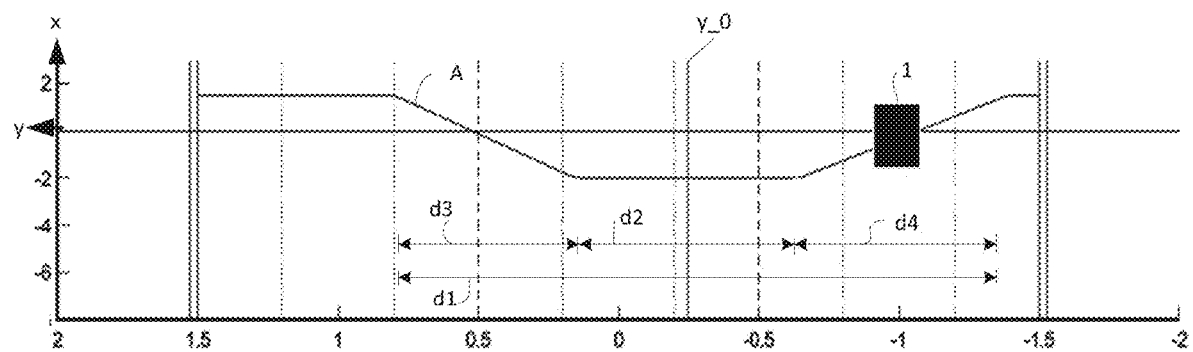
Figure 4F:
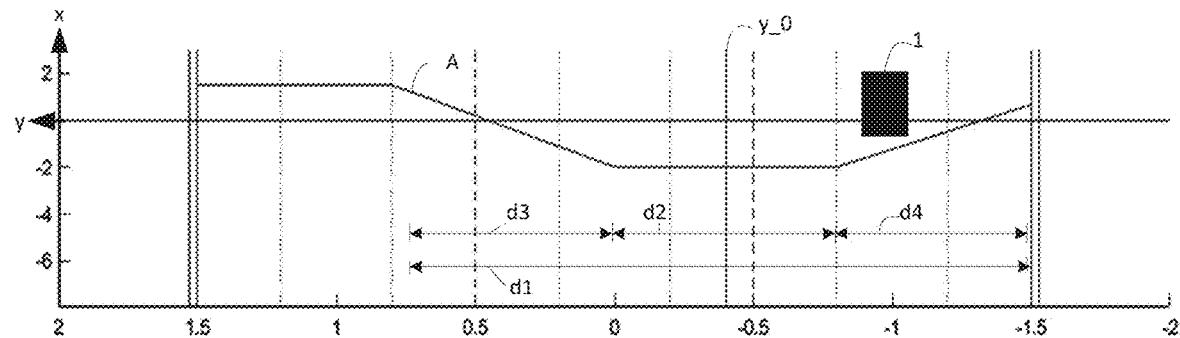
Figure 4G:
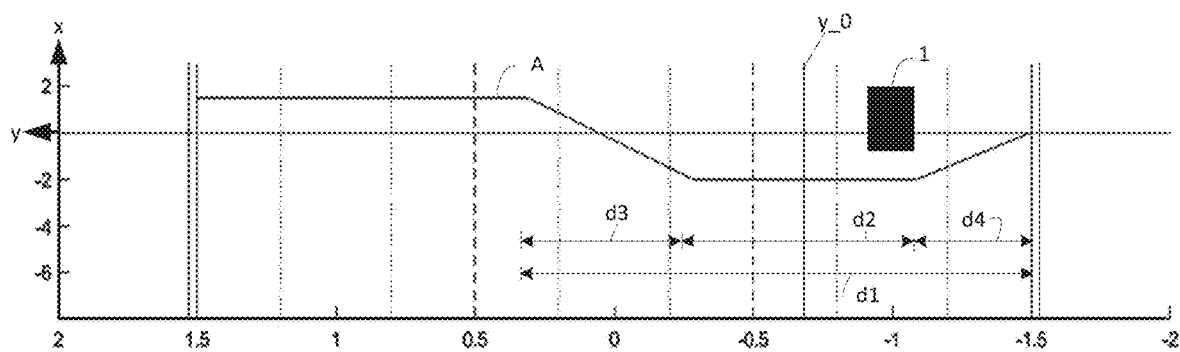

By way of example, in the example of FIGS. 4C to 4G, the lateral position y_o of the leading vehicle O moves by the same distance between FIGS. 4C and 4D as between FIGS. 4A and 4B. However, as shown in FIG. 4D, the target longitudinal acceleration of the host vehicle 1 set by the apparatus 10 of FIG. 1A decreases relative to FIG. 4C but remains greater than 0. In fact, the host vehicle 1 being autonomously controlled in accordance with the target longitudinal acceleration set by the apparatus 10 is not required to decelerate until FIG. 4E, which shows a time instant at which the lateral position y_o of the leading vehicle O has almost reached the lane boundary between the lane in which the leading vehicle O is travelling and the lane in which the host vehicle 1 is travelling and into which the leading vehicle O moves. Furthermore, the apparatus 10 of FIG. 1A only sets the target lateral acceleration to a minimum acceleration (maximum deceleration) when the lateral position y_o of the leading vehicle is well within the lane in which the host vehicle 1 is travelling.

Accordingly, even in cases where the leading vehicle O does not drive safely and, for example, cuts into the lane in which the host vehicle 1 is driving, at an unsafe longitudinal distance ahead of the host vehicle 1, the target longitudinal acceleration set by the apparatus 10 of FIG. 1A may change smoothly, thereby allowing the host vehicle 1 being controlled using this target acceleration to avoid uncomfortable driving manoeuvres, such as sharp jerks, that does not resemble human-like behaviour.

FIG. 1B is a schematic illustration of a vehicle 1, according to an example embodiment herein.

The vehicle 1 includes a position determination apparatus 5 in the example form of a sensor for detecting a position of a second vehicle relative to the vehicle 1. The vehicle 1 also includes the apparatus 10 of FIG. 1A, which is arranged to determine set a target lateral longitudinal acceleration of the vehicle 1 using the detected position of the second vehicle. The vehicle 1 also has an automatic driver system 15, which is arranged to autonomously control the speed of the vehicle 1 using the determined set target longitudinal acceleration.

The vehicle 1 is a host vehicle, i.e. a vehicle to be autonomously controlled. The combination of the automatic driver system 15 and the apparatus 10 may be referred to as an autonomous driving system, i.e. one capable of performing behaviour and trajectory planning and subsequent control of the host vehicle.

The position determination apparatus 5 may have any suitable sensor for detecting a position of a second vehicle relative to the vehicle 1. By way of example, the sensor may have one or more of a Radar sensor, a camera, a Lidar sensor, or the like. However, the position determination apparatus 5 is not limited to being a sensor configured to detecting the position of the second vehicle relative to the vehicle 1, and may take the alternative form of a receiver configured to receive from the second vehicle (or another entity) position information indicative of the position of the second vehicle, or information from which the position of the second vehicle may be determined. Additionally or alternatively, the position determination apparatus 5 may, as in the present example embodiment, have a data store for storing the determined position of the second vehicle relative to the first vehicle 1.

In the example embodiment shown in FIG. 1B, the apparatus 10 and the automatic driver system 15 are illustrated as separate devices. The functionalities of the apparatus 10 and the automatic driver system 15 may alternatively be provided by an appropriately configured single device, e.g. an appropriately programmed computer processor. Additionally or alternatively, the position determination apparatus 5 may be integrally provided with either of the apparatus 10 and the automatic driver system 15.

Figure 5:
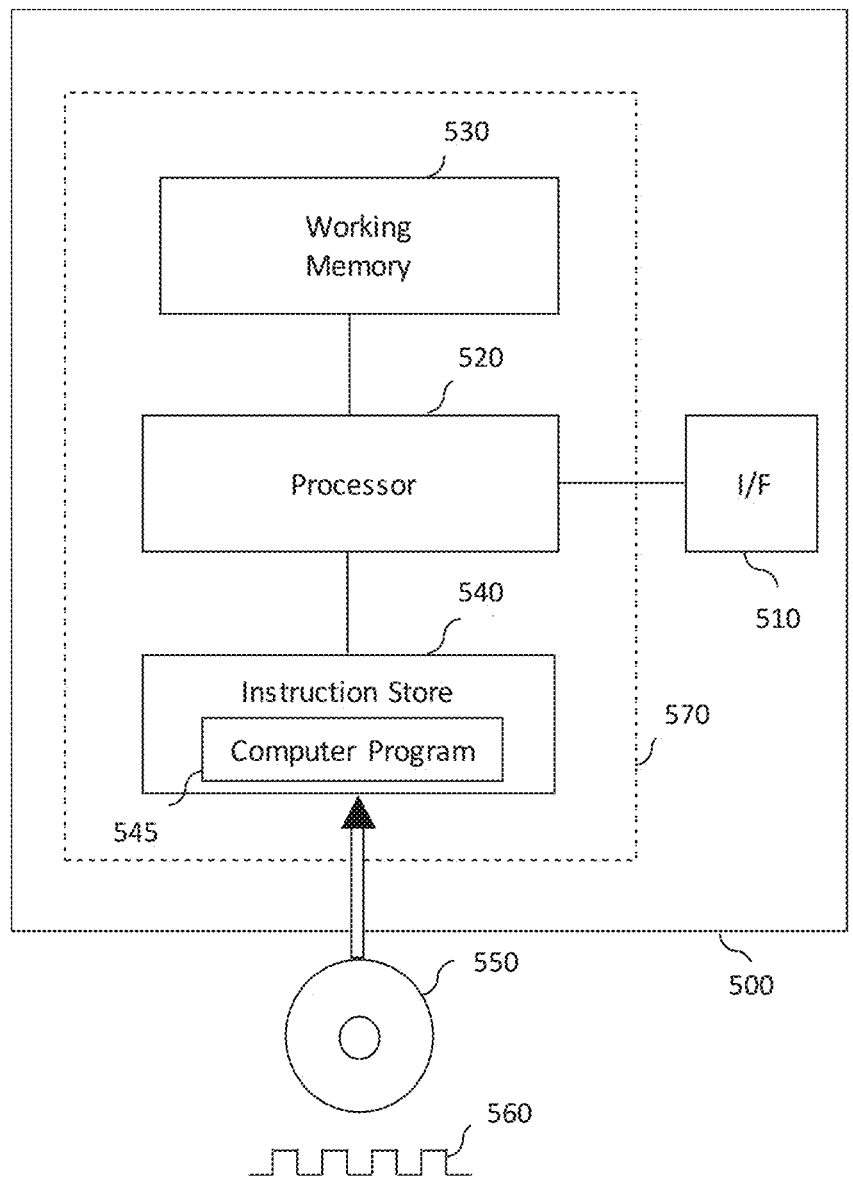
FIG. 5 is a block diagram illustrating an example implementation of the apparatus of the example embodiment in programmable signal processing hardware.

FIG. 5 is a schematic illustration of programmable signal processing apparatus 500, which may be configured to implement the functionality of the apparatus 10. The signal processing apparatus 500 has an interface module 510 for receiving information and data about the vehicle 1 and its environment. The signal processing apparatus 500 also has a processor (CPU) 520 for controlling the apparatus 10, a working memory 530 (e.g. a random-access memory) and an instruction store 540 storing a computer program (545) having computer-readable instructions which, when executed by the processor 520, cause the processor 520 to perform the processing operations of the apparatus 10. The instruction store 540 may include a ROM (e.g. in the form of an electrically erasable programmable read-only memory (EEPROM) or flash memory) which is pre-loaded with the computer-readable instructions. Alternatively, the instruction store 540 may include a RAM or similar type of memory, and the computer-readable instructions can be input thereto from a computer program product, such as a computer-readable storage medium 550 such as a CD-ROM, etc. or a computer-readable signal 560 carrying the computer-readable instructions.

In the present example embodiment, the combination 570 of the hardware components shown in FIG. 5, including the processor 520, the working memory 530 and the instruction store 540, is configured to implement the functionality of each of the component modules of the apparatus 10 shown in FIG. 1A.

Figure 6:
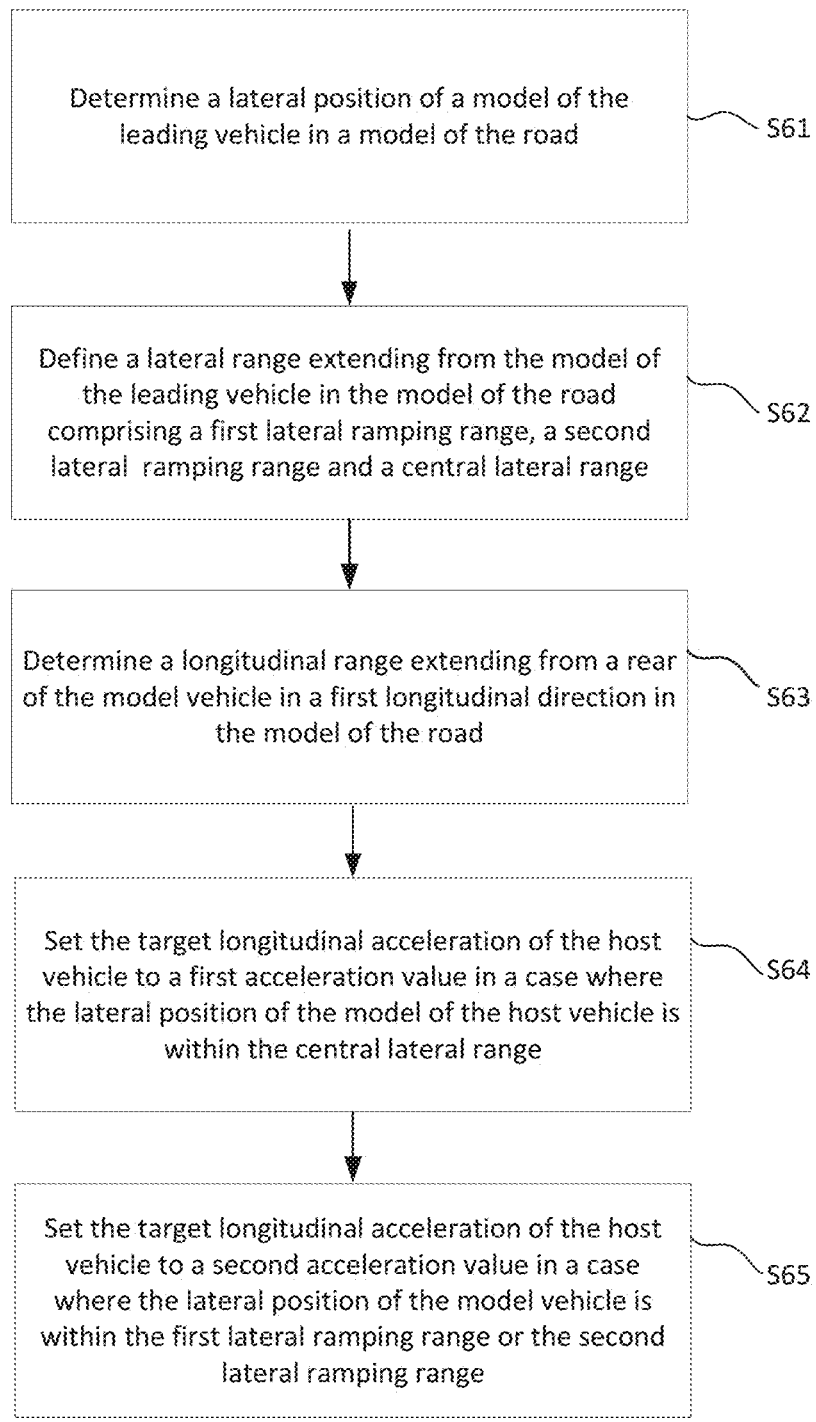
FIG. 6 is a flow diagram illustrating a process by which the apparatus of FIG. 1A sets a target longitudinal acceleration of a host vehicle relative to a road along which the host vehicle is travelling, in accordance with the example embodiment herein.

FIG. 6 is a flow diagram illustrating a process by which the apparatus 10 of FIG. 1A sets a target longitudinal acceleration of a host vehicle 1 relative to a road 20 along which the host vehicle 1 and a leading vehicle O are travelling, for use in autonomous control of the host vehicle 1.

In process step S61 of FIG. 6, the position determination module 11 determines a lateral position of a model of the leading vehicle O in a model of the road 20, based on a detected position of the leading vehicle O.

The position determination module 11 may obtain the detected position of the leading vehicle O by any suitable means. By way of example, in example embodiments such as the present example embodiment, in which the apparatus 10 is included in the vehicle 1 shown in FIG. 1B, the position determination module 11 may be configured to receive information indicative of the detected position of the leading vehicle O from the position determination apparatus (sensor) 5 and to determine the lateral position of the leading vehicle O based on the detected position indicated by the information from the sensor.

The apparatus 10 may be configured to store the model of the road 20. The apparatus 10 may be configured to receive a generated model of the road 20 or to alternatively receive information from equipment such as Radars, cameras, inertial measurement units etc., that collect data about the host vehicle 1 and its environment, and to generate the model of the road 20 using the received information. In such example embodiments, in which the apparatus 10 stores the model of the road 20, the position determination module 11 may be configured to obtain a detected position of the leading vehicle from the model of the road 20.

By way of alternative, the position determination module 11 may be configured to obtain the detected position of the leading vehicle O by receiving information indicative of the detected position of the leading vehicle from an external entity by any suitable means known to those versed in the art.

Furthermore, the position determination module 11 may determine the lateral position of the model of the leading vehicle O based on a detected position of the leading vehicle O in any suitable way depending on the form in which the detected position of the leading vehicle O is obtained. By way of example, in a case where the detected position of the leading vehicle O is provided as coordinates in the lane coordinate system, the position determination module 11 may determine the lateral position of the model of the leading vehicle O as the y-coordinate. By way of alternative, in cases where the detected position of the leading vehicle O is in the form of real-world coordinates (e.g. GPS coordinates), the position determination module 11 may be configured to convert these into coordinates in the lane coordinate system and determine the lateral position of the model of the leading vehicle O as the resulting y-coordinate in the lane coordinate system. Alternatively, in cases where the detected position of the leading vehicle O is in the form of a lateral and longitudinal position relative to the host vehicle 1 or a distance and direction relative to the host vehicle 1, the position determination module 11 may be configured to convert these into coordinates in the lane coordinate system and determine the lateral position of the model of the leading vehicle O as the resulting y-coordinate in the lane coordinate system.

The position determination module 11 may also determine a longitudinal position of the model of the leading vehicle O in the model of the road 20, based on a detected position of the leading vehicle 20. The position determination module 11 may determine the longitudinal position of the leading vehicle O by any of the means discussed above in relation to the determination of the lateral position of the leading vehicle O.

In process step S62 of FIG. 6, the lateral range defining module 12 defines a lateral range extending from the model of the leading vehicle O in the model of the road 20. The lateral range extends in a first lateral direction in the model of the road 20 and a second lateral direction in the model of the road 20 which is opposite to the first lateral direction.

As described above, the lateral range has a first lateral subrange, a second lateral subrange and a central lateral subrange between the first lateral subrange and the second lateral subrange, wherein the lateral range is defined so as to increase as a distance between the determined lateral position of the model of the leading vehicle O and a lateral position in the model of the road 20 of a centre of a lane 21B among the plurality of lanes in which the model of the leading vehicle O is located increases, with the increase in the lateral range being caused by an increase in one or both of the first lateral subrange and the second lateral subrange.

The first lateral direction may, as in the present example embodiment, be a positive y-direction (left in the example of FIG. 2B) and the second lateral direction may, as in the present example embodiment, be a negative y-direction (right in the example of FIG. 2B). That is, the lateral range may extend on either side of the leading vehicle O in the y-axis. Additionally or alternatively, the first lateral subrange may extend in the first lateral direction from a furthest point of the central lateral subrange in the first lateral direction and the second lateral subrange may extend in the second lateral direction from a furthest point of the central lateral subrange in the second lateral direction.

The lateral range may be defined to correspond to a safe lateral distance such as, for example, a distance required to perform a lateral emergency manoeuvre of reducing lateral velocity until the host vehicle 1 is being driven in a straight line. As such, the lateral range may be considered to define an extent on either side of the leading vehicle O in which the presence of the leading vehicle O would be expected to affect the autonomous control of the host vehicle 1, e.g. by placing some limitation of its lateral movement, velocity or acceleration, in order to ensure safe driving of the autonomously controlled host vehicle 1.

The fixed width of the central lateral subrange may, as in the present example embodiment, be based on a width of the bias region within a lane among the plurality of lanes 21A, 21B, 21C, in which bias region the host vehicle 1 is autonomously controlled to remain while travelling in the lane. The width of the bias region may, for example, be the value of the lateral offset $\Delta y_{bias}$. This value of the lateral offset $\Delta y_{bias}$ may be provided as a scaled version of real-world dimensions.

By way of example, the lateral range defining module 12 may, as in the present example embodiment, define the lateral range by evaluating one or more functions that map a set of one or more input or variables (e.g. the lateral position of the leading vehicle O or its lateral position relative to a centre of the lane 21B or any of the dynamic properties of the host vehicle 1 and/or the leading vehicle O discussed above in relation to FIG. 2A) to a single output value of the lateral range at each lateral position on the y-axis. The output values of the one or more functions may allow the central lateral subrange, the first lateral subrange and the second lateral subrange to be determined based on zero-crossings, discontinuities or other features. Alternatively, the lateral range defining module 12 may separately define each of the central lateral subrange, the first lateral subrange and the second lateral subrange by evaluating respective one or more functions. The one or more functions may be defined such that the lateral range increases with increasing distance between the determined lateral position of the model of the leading vehicle O and a lateral position in the model of the road 20 of a centre of a lane 21B among the plurality of lanes in which the model of the leading vehicle O is located during a lane change by the model of the leading vehicle (O) from the lane to an adjacent lane.

The lateral range defining module 12 may, as in the present example embodiment, be configured to determine the lateral range using a respective lateral velocity of the leading vehicle O such that the lateral range increases with increasing lateral velocity of the leading vehicle O. This may help to ensure that, in a case where the leading vehicle O is moving at a relatively high lateral velocity and, as such, may approach the host vehicle 1 relatively quickly, the extent d1 of the lateral range is increased. The presence of the leading vehicle O may therefore influence the target lateral acceleration of the host vehicle 1 determined by the apparatus 10 at a greater distance from the host vehicle 1 than in a case where the leading vehicle O is moving at a relatively low lateral velocity such that the host vehicle 1 has more time to react to the lateral movements of the leading vehicle O.

By way of more detailed example, the lateral range defining module 12 may, as in the present example embodiment, determine the lateral range using the following functions and sets:

$$\text{drop}(x, a, b) = \min\left(1, 1 - \frac{x-a}{b-a}\right). \quad (1)$$

$$\text{clip}(x, a, b) = \min(\max(a, x), b) \quad (2)$$

$$\text{interp}([x_1, x_2 \ldots x_n], [y_1, y_2 \ldots y_n], x) = \quad (3)$$

$$\begin{cases} y_1, & x \leq x_1 \\ y_k + a(y_{k+1} - y_k), & x_k \leq x \leq x_{k+1} \\ \quad a = \dfrac{x - x_k}{x_{k+1} - x_k} \\ y_n, & x \geq x_n \end{cases}$$

$$ys = [-0.5, -\Delta y_{bias}, \Delta y_{bias}, 0.5] \quad (4)$$

$$rs = [1.5 - \Delta y_{bias}, 1, 1 - \Delta y_{bias}, 1.5 - \Delta y_{bias}], \quad (5)$$

$$\Delta y_{base}(y) = \text{interp}(ys, rs, \tilde{y}), \quad (6)$$

where $\tilde{y} \in [-0.5, 0.5)$ and $\tilde{y} = (y+0.5 \bmod 1) - 0.5$ $$\Delta y_{v,range}(y, v) = \quad (7)$$
$$\text{interp}([0, \Delta y_{bias}, 0.5], [0, 1 - \Delta y_{bias}, 0], \tilde{y})\text{clip}\left(\frac{v - v_\mu}{v_{min,switch} - v_\mu}, 0, 1\right)$$

$$\Delta y_{range}(y, v) = \Delta y_{base}(y) + \Delta y_{v,range}(y, v). \quad (8)$$

In equation (7) above, $v_\mu$ is a threshold velocity (e.g. the peak lateral velocity to be used for lateral movements within the lane that are not indicative of a lane switch (referred to herein as "biasing")) below which the lateral range does not increase in order to avoid an increase of the lateral range being caused by small oscillations of the leading vehicle O, which may, in turn, result in uncomfortable behaviour, and $v_{min,switch}$ is a minimum lateral velocity to be used during lane switching or that is indicative of lane switching. By calculating the first (left) and second (right) lateral subranges separately, it can be ensured that lateral range is only increased on the side of the lane in the direction of the velocity.

Figure 7:
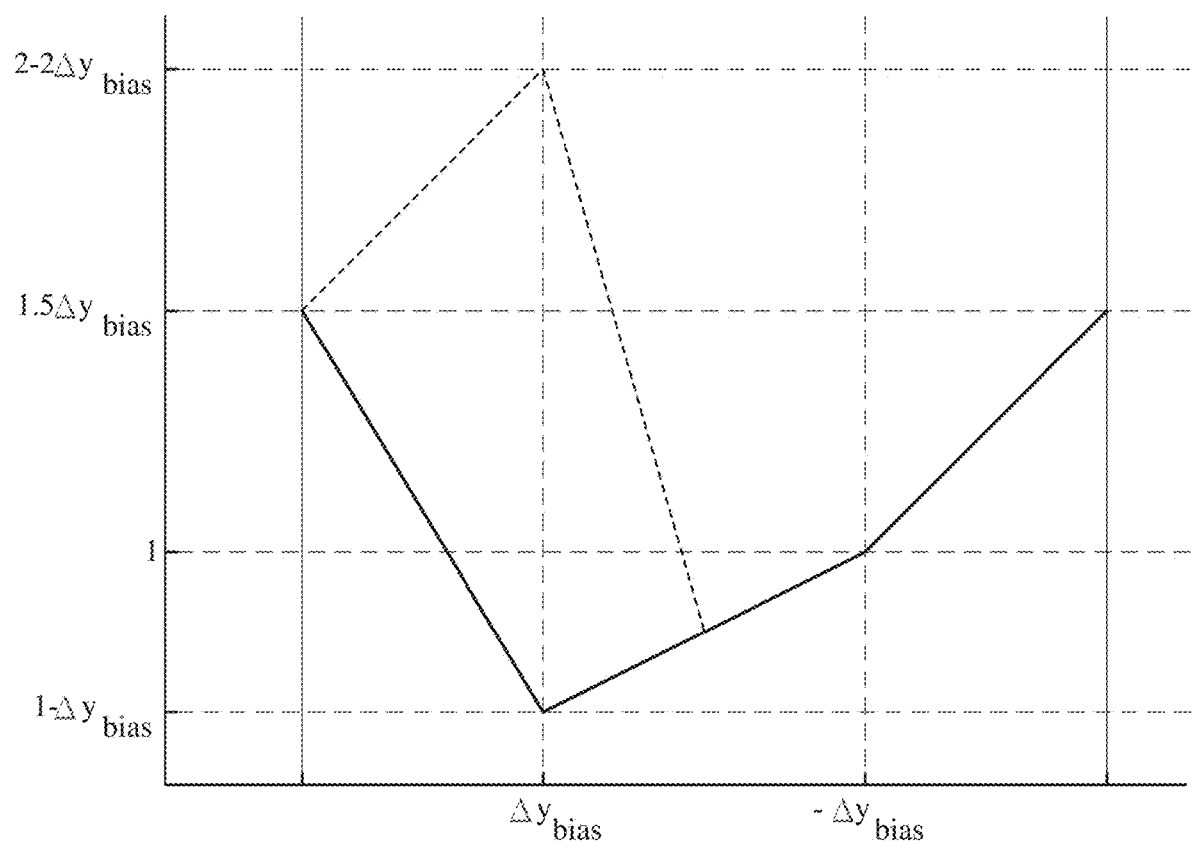
FIG. 7 is a plot illustrating a variation of a left range calculated using a lateral range function described herein.

FIG. 7 is a plot illustrating a variation of a left lateral subrange with position within a lane, which has been calculated for an object component using a lateral range function described herein so as to ensure that the component is constant outside of the bias region whenever the vehicle is in the bias region. The range with lateral velocity $v_y \leq v_\mu$ is shown by the solid line in FIG. 7, while the range with lateral velocity $v_y \geq v_{min,switch}$ is shown by the dotted line in FIG. 7. In between, it is given by linear interpolation between the two. As illustrated in FIG. 7, the left range decreases when moving left from the center and increases when moving right. When the velocity to the left is higher, it will instead have an increased range moving away from the lane center to the left.

In sets (4) and (5) and functions (6) to (8) above, it is assumed that the y-axis is scaled to the lane width such that each increment or decrement of 1 in the y-axis represents the width of one lane, as in the present example embodiment, such that the value of 0.5 may represent the half the width of a lane of the road 20 (i.e. a distance between a centre of a lane and a boundary thereof). Alternatively, in example embodiments in which the y-axis is not so scaled, the value of 0.5 in sets (4) and (5) and functions (6) to (8) may be replaced with any suitable value corresponding to half of the width of a lane of the road 20 and other values (e.g. 1.5, 1, etc.) may be scaled accordingly.

Using the above functions and sets, the lateral scaling function $k_{y,i}$ may, as in the present example embodiment, be formally defined as follows:

$$l_o = \Delta y_{range}(y_i, v_{y,i}) \quad (9)$$

$$r_o = \Delta y_{range}(-y_i, -v_{y,i}) \quad (10)$$

$$k_{y,i} = \min(\text{drop}(y - y_i, 2\Delta y_{bias}, l_o), \text{drop}(y_i - y, 2\Delta y_{bias}, r_o)), \quad (11)$$

where $l_o$ represents a maximum extent of the lateral range in the first lateral direction, $r_o$ represents a maximum extent of the lateral range in the second lateral direction, and the fixed width of the central lateral subrange is $2\Delta y_{bias}$, $y_i$ is the lateral position of the leading vehicle O, and $v_{y,i}$ is the lateral velocity of the leading vehicle O.

In particular, the lateral scaling function (11) may be used to define a lateral range and function values that vary across the lateral range according to a profile such as that shown in FIGS. 4C to 4G.

By way of alternative, in some example embodiments, the lateral range defining module 12 may define the lateral range by setting the central lateral subrange as a first predetermined distance extending in the first lateral direction and in the second lateral direction from the lateral position of the leading vehicle O, setting the first lateral subrange as a second predetermined distance extending in the first lateral direction from a furthest point of the central lateral subrange in the first lateral direction and setting the second lateral subrange as a third predetermined distance (which may for example, be the same as the second predetermined distance) extending in the second lateral direction from a furthest point of the central lateral subrange in the second lateral direction. In such example embodiments, the lateral range defining module 12 may, for example, use a lateral position of the leading vehicle O relative to a centre of a lane 21B among the plurality of lanes, in which the leading vehicle O is located, to determine the lateral range, specifically by selecting the distance for each of the first lateral range and the second lateral range from a plurality of predetermined distances based on the respective lateral position of the leading vehicle O relative to a centre of a lane 21B among the plurality of lanes in which the leading vehicle O is located. For example, a larger predetermined distance may be selected where the distance between the lateral position of the leading vehicle O and the centre of the lane 21B in which it is driving is relatively large (e.g. when the leading vehicle O is switching lanes). As such, the lateral range may increase with increasing distance between the determined lateral position of the model of the leading vehicle O and a lateral position in the model of the road 20 of a centre of a lane 21B among the plurality of lanes in which the model of the leading vehicle O is located during a lane change by the model of the leading vehicle (O) from the lane to an adjacent lane of the plurality of lanes.

The lateral range may be defined such that, during a lane change by the leading vehicle O, the lateral range increases with an increasing distance between the lateral position of the leading vehicle O and the centre of the lane 21B in which it is driving so as to reach past the adjacent lane of the leading vehicle O to which the leading vehicle O is performing the lane change, such that the host vehicle 1 may be controlled to start breaking in time, if the host driver were to attempt a simultaneous lane change into the same lane in a case where the host vehicle 1 is within the longitudinal range.

In process step S63 of FIG. 6, the longitudinal range setting module 13 sets a longitudinal range extending from a rear of the model of the leading vehicle O in a first longitudinal direction in the model of the road 20.

By way of example, the first longitudinal direction may, as in the present example embodiment, be a direction opposite to the direction of travel of the leading vehicle O. Referring to the example of FIG. 2A, the first longitudinal direction may therefore be a negative x-direction, that is, a direction opposite to the arrow 27 in FIG. 2A.

The longitudinal range setting module 13 may set the longitudinal range to a predetermined value. The predetermined value may, for example, correspond to the longitudinal safe distance defined as a distance required for the host vehicle 1 to perform a longitudinal emergency manoeuvre such as braking to a stop in time to avoid a collision with another vehicle. Such a longitudinal distance may be based, for example, on the rules of the RSS safety model. Alternatively, the predetermined value may correspond to a predetermined distance outside which additional model vehicles are not considered sufficiently proximal to be in the environment of the host vehicle 1 or a fixed distance.

In example embodiments such as the present example embodiment, in which the longitudinal range setting module 13 defines a longitudinal ramping range, the combined longitudinal range and longitudinal ramping range function $k_{x,i}$ may be formally defined as follows:

$$k_{x,i}=\text{drop}(-x_i, -1, 0), \tag{12}$$

where $x_i$ is the longitudinal position of the leading vehicle O.

In process step S64 of FIG. 6, the target longitudinal acceleration setting module 14 sets the target longitudinal acceleration of the host vehicle 1.

More particularly, for any longitudinal position of a model of the host vehicle 1 that is within the longitudinal range, the target longitudinal acceleration setting module 14 sets the target longitudinal acceleration of the host vehicle 1 to a respective first acceleration value in a case where a lateral position of the model of the host vehicle 1 in the model of the road 20 is within the central lateral subrange, in process step S64 of FIG. 6.

Alternatively, in a case where the lateral position of the model of the host vehicle 1 in the model of the road 20 is within the first lateral subrange or within the second lateral subrange, the target longitudinal acceleration setting module 14 sets the target longitudinal acceleration of the host vehicle 1 to a respective second acceleration value, which is dependent on the lateral position of the model of the host vehicle 1 in the model of the road 20 relative to the determined lateral position of the model of the leading vehicle 1, and is greater than the first acceleration value for longitudinal position of the model of the host vehicle 1, in process step S64 of FIG. 6.

The first acceleration value may be a deceleration value, that is, a value indicative of an acceleration in a longitudinal direction opposite to the direction of travel of the host vehicle 1 (e.g. the negative x-direction opposite to the direction of arrow 27 in FIGS. 2A and 2B). Correspondingly, the second acceleration value may be a deceleration value (a value indicative of an acceleration in a longitudinal direction opposite to the direction of travel of the host vehicle 1) or may be indicative of an acceleration in the direction of travel of the host vehicle 1. The first acceleration value may alternatively be indicative of an acceleration in the direction of travel of the host vehicle 1 (e.g. the positive x-direction indicated by the arrow 27 in FIGS. 2A and 2B), for example in a case where the leading vehicle O is travelling faster than the host vehicle 1 or where the longitudinal separation of the two vehicles is large enough. Correspondingly, the second acceleration value may be a value indicative of an acceleration in the direction of travel of the host vehicle 1 or may be indicative of a deceleration in the direction of travel of the host vehicle 1.

The second acceleration value may, as in the present example embodiment, ramp (increase linearly) from the first acceleration value, when the lateral position of the model of the host vehicle 1 is at a furthest edge in the second lateral direction of the first lateral subrange, to a third acceleration value, when the lateral position of the model of the host vehicle 1 is at a furthest edge in the first lateral direction of the first lateral subrange, the third acceleration value being greater than the first acceleration value. Correspondingly, the second acceleration value may, as in the present example embodiment, ramp from the first acceleration value, when the lateral position of the model of the host vehicle 1 is at a furthest edge in the first lateral direction of the second lateral subrange, to a fourth acceleration value when the lateral position of the model of the host vehicle 1 is at a furthest edge in the second lateral direction of the second lateral subrange, the fourth acceleration value being greater than the first acceleration value.

The first acceleration value may be set to a predefined value or a value estimated from current conditions of the host and leading vehicles' environment (e.g. weather conditions such as precipitation, visibility, etc). Alternatively, the first acceleration value may be dependent on the longitudinal velocity of the model of the host vehicle 1 and the longitudinal velocity of the model of the leading vehicle O, or on these longitudinal velocities and the longitudinal distance between the model of the leading vehicle O and the model of the host vehicle 1.

The third and fourth acceleration values may, as in the present example embodiment, be the same acceleration value. Ramping may be used to describe a linear increase from a from a first value to a second value. The third and fourth acceleration values may be set as any suitable value. By way of example, the third and fourth acceleration values may be set at an acceleration value required to cause a longitudinal velocity of the host vehicle 1 to tend towards a target longitudinal velocity. The target longitudinal velocity may, be a desired velocity such as a speed limit of the road 20 or comfortable cruising speed of the host vehicle 1.

FIGS. 4C to 4G illustrate an example in which the line A is indicative of the target longitudinal acceleration of the host vehicle 1 set by the apparatus 10. As shown in FIGS. 4C to 4G, the target longitudinal acceleration has a set value for lateral positions on the y-axis within the central lateral subrange d2, that is, the first acceleration value. Correspondingly, the target longitudinal acceleration has a set value for lateral positions on the y-axis outside the lateral range, that is, the third acceleration value (the fourth acceleration value being equal to the third acceleration in the example of FIGS. 4C to 4G). By way of non-limiting example, the first acceleration value may be $-2$ m/s$^2$ (that is, an acceleration of 2 m/s$^2$ in the direction opposite the direction of travel of the host vehicle 1, i.e. in the negative x-direction, which may also be referred to as a deceleration of 2 m/s$^2$) and the third acceleration value may be 2 m/s$^2$ (that is, an acceleration of 2 m/s$^2$ in the direction of travel of the host vehicle 1, i.e. in the positive x-direction).

As shown in the example of FIGS. 4C to 4G, within the extent d3 of the first lateral ramping region, the second acceleration value increases linearly (ramps) between the first acceleration value at the boundary of the central lateral subrange and the first lateral subrange to the third acceleration value at the end point of the lateral range, i.e. furthest edge in the first lateral direction of the first lateral subrange. Correspondingly, within the extent d4 of the second lateral ramping region, the second acceleration value increases linearly (ramps) between the first acceleration value at the boundary of the central lateral subrange and the second lateral subrange to the third acceleration value at the end point of the lateral range, i.e. furthest edge in the second lateral direction of the second lateral subrange. Although the second acceleration value varies linearly across the first and second lateral subranges in the present example embodiment, this variation may alternatively be non-linear (preferably monotonic), at least in at least a portion of one or both of the first lateral subrange and the second lateral subrange.

Optionally, in a case where the position of the model of the host vehicle 1 is not in any of the first, second and third regions 31, 32 and 33, the target longitudinal acceleration setting module 14 may set the target longitudinal acceleration of the host vehicle 1 to a predetermined value, which may, for example, be set to a maximum comfortable acceleration of the host vehicle 1.

The target longitudinal acceleration setting module 14 may, as in the present example embodiment, be configured to set the target longitudinal acceleration of the host vehicle 1 based on the determined ranges and the position of the model of the host vehicle 1 in the road 20, by setting the target longitudinal acceleration of the host vehicle 1 in accordance with a modified version of the technique described in the Master's Thesis of Oskar Larsson, in which the determination of longitudinal force described in section 3.2 of the thesis and the conversion of this force into a longitudinal acceleration as described in section 3.5 of the thesis is modified to use the lateral range defined by the lateral range defining module 12, as described below.

In particular, a longitudinal force field may be generated from two components, namely a cruise control component $f_{cc}$ and a trail component $f_{trail}$ for each leading vehicle i in the environment of the host vehicle 1. The cruise control component $f_{cc}$ and the trail component $f_{trail}$ are components of an adaptive cruise control (ACC) algorithm, which controls the longitudinal acceleration of the host vehicle 1.

The cruise control component $f_{cc}$ corresponds to a force required to cause a longitudinal velocity of the host vehicle tends towards a target longitudinal velocity and may be defined using function (2) above as follows:

$$f_{cc}(v) = \text{clip}(k(v_{des} - v), a_{min}, a_{max}), \quad (13)$$

where $v_{des}$ is the target longitudinal velocity of the host vehicle 1, and $a_{min}$ and $a_{max}$ are the smallest and largest comfortable acceleration to reach a certain velocity.

The trail component $f_{trail}$ corresponds to a force required to ensure that the host vehicle 1 maintains a safe longitudinal distance to a leading vehicle. The trail component $f_{trail}$ should allow the host vehicle 1 to smoothly approach a predetermined distance (target headway) to the leading vehicle 1, while allowing sufficient distance to react to an emergency with the required braking response. Since the host vehicle 1 should only decelerate if the leading vehicle is in front of the host vehicle, the trail component $f_{trail}$ may be scaled down outside an area of full effect by using the lateral range defined by the lateral range defining module 12.

The behaviour caused by the trail component $f_{trail}$ in the area of full effect may be described as follows. The trail component $f_{trail}$ is based on an overdamped harmonic oscillator, defined in equation (14), which allows the velocity and distance difference to decay exponentially:

$$x'' = -2\eta\omega x' - \omega^2 x \quad (14)$$

Since the initial distance to the leading vehicle O may be much less than the target headway as a result of the leading vehicle O cutting into the lane in which the host vehicle 1 is travelling, i.e. a cut-in, two important adaptation to the oscillator of equation (14) are made.

Firstly, the distance at which a leading vehicle is allowed to cut in can be a lot less than the target headway. The resulting response according to the oscillator would prompt a strong braking by the host vehicle 1, which is both uncomfortable and potentially dangerous. In order to limit the reaction to uncomfortable yet safe cut-ins, the braking force when the leading vehicle O is at the same velocity as the host vehicle 1 and not decelerating is saturated at $a_{min}$, the minimum comfortable acceleration from the cruise control component $f_{cc}$. The trail component $f_{trail}$ depends on the desired headway given as driver input $t_{des}$, as well as the algorithm parameters $\eta$, $\omega$ and margin (i.e. a minimum distance to the vehicle ahead).

Accordingly, the following function and equation may be defined for use in defining the trail component $f_{trail}$ for the leading vehicle O (where the subscript i denotes that the leading vehicle O may be the $i^{th}$ vehicle among one or more vehicles defined in the model of the road 20 in addition to the host vehicle 1):

$$d_{des}(v_o, l_o) = \frac{l}{2} + \frac{l_o}{2} + \text{margin} + v_o t_{des} \quad (15)$$

$$A_{trail,i} = a_{x,i} + 2\eta\omega(v_{x,i} - v_x) + \max(a_{min}, \omega^2(x - d_{des}(v_{x,i}, l_i))), \quad (16)$$

where l is the longitudinal extent of the host vehicle 1, $l_i$ is the longitudinal extent of the leading vehicle O, $v_x$ is the longitudinal velocity of the host vehicle 1, $v_{x,i}$ is the longitudinal velocity of the leading vehicle O and $a_{x,i}$ is the longitudinal acceleration of the leading vehicle O.

Secondly, as the oscillator of equation (14) is agnostic to absolute distance, it may reduce braking before impact as the relative velocity gets lower than $(a_{min} - a_{x,i})/2\eta\omega$. In order to ensure full braking until the velocities of the host vehicle 1 and the leading vehicle O are equal in dangerous situations so as to avoid a smooth decrease of braking before stopping, another component is included in the trail component $f_{trail}$, the full brake distance. This component only affects the host vehicle 1 in dangerous situations as a result of a cut-in by a leading vehicle. The full brake distance may be defined as follows (where the subscript i denotes that the leading vehicle O may be the $i^{th}$ vehicle among one or more vehicles defined in the model of the road 20 in addition to the host vehicle 1):

$$d_{emr,i} = \frac{l_i}{2} + \frac{l}{2} + \text{margin} + \frac{\max(0, v - v_o)^2}{2b_{max}}, \quad (17)$$

where $b_{max}$ is a maximum braking deceleration of the host vehicle.

Using the above functions (16) and (17) and the lateral scaling function $k_{y,i}$ defined by function (11) and the combined longitudinal range and longitudinal ramping range $k_{x,i}$ defined by function (12), the trail component may, as in the present example embodiment, be defined as follows (where the subscript i denotes that the leading vehicle O may be the $i^{th}$ vehicle among one or more vehicles defined in the model of the road 20 in addition to the host vehicle 1):

$$f_{trail,i} = \min((\min(A_{trail,i}, A_{emr,i}) - a_{max}) \min(k_{x,i}, k_{y,i}) + a_{max}, a_{max}). \quad (18)$$

In accordance with equation (18), the scaling provided by the longitudinal and lateral scaling functions, $k_{x,i}$ and $k_{y,i}$, is applied to the difference between the trail component and the full acceleration. This introduces a dependence on parameter $a_{max}$, which is the highest acceleration of the cruise component $f_{cc}$.

By using the lateral scaling factor $k_{y,i}$ defined by function (11) and the combined longitudinal range and longitudinal scaling factor $k_{x,i}$ defined by function (12), together with the modified version of the technique described in the Master's Thesis of Oskar Larsson, may provide a modified trail component $f_{trail}$ that affects the host vehicle 1 when a leading vehicle O is in front of the host vehicle O and that ramps up to allow acceleration as the lateral distance increases, or the longitudinal position of the leading vehicle becomes negative, while allowing that the host vehicle 1 controlled in accordance with this acceleration to avoid uncomfortable driving, such as sharp jerks, that does not resemble human-like behaviour when the leading vehicle O cuts in in front of the host vehicle 1.

To reduce such jerks, the target longitudinal acceleration of the host vehicle 1 in example embodiments may, more generally, be set by scaling and offsetting a value of a longitudinal acceleration, which has been determined by any ACC algorithm, by a value of a lateral scaling function $k_{y,I}$ as described herein such that, for any longitudinal position of a model of the host vehicle 1 that is within the longitudinal range, the target longitudinal acceleration of the host vehicle 1 is set to a respective first acceleration value in the case where the lateral position of the model of the host vehicle 1 is within the central lateral subrange, and to a respective second acceleration value in the case where the lateral position of the model of the host vehicle 1 is within the first lateral subrange or the second lateral subrange. For example, the target longitudinal acceleration of the host vehicle 1 may be set as a smaller of a predetermined acceleration value (e.g. $a_{max}$) and a value obtained by offsetting, by the predetermined acceleration value, a product of a value of the lateral scaling function $k_{y,I}$ as described herein and a difference value, which is a difference between a value of a longitudinal acceleration determined by any ACC algorithm and the predetermined acceleration value, the target longitudinal acceleration of the host vehicle 1 being set such that, for any longitudinal position of a model of the host vehicle 1 that is within the longitudinal range, the target longitudinal acceleration of the host vehicle 1 is set to a respective first acceleration value in the case where the lateral position of the model of the host vehicle 1 is within the central lateral subrange, and to a respective second acceleration value in the case where the lateral position of the model of the host vehicle 1 is within the first lateral subrange or the second lateral subrange. Setting the target longitudinal acceleration of the host vehicle 1 in accordance with these example embodiments results in the same adjustment to the longitudinal acceleration output by the ACC algorithm being made for any given relative lateral positioning of the model of the host vehicle 1 and the model of the leading vehicle 1, the adjustment being independent of their relative longitudinal positioning in the model of the road 20. As a result, the advantages set out above may be attained over a greater range of longitudinal separations of the host and leading vehicles than may be attained using the Master's Thesis of Oskar Larsson.

Furthermore, the method of setting the target longitudinal acceleration of the host vehicle 1 of the example embodiment may ensure that the host vehicle 1 brakes sufficiently when the leading vehicle O is in the same lane as the host vehicle 1, and make a smooth transition if the host vehicle 1 cuts in behind the leading vehicle O.

The process of FIG. 6 may, as in the present example embodiment, include a further process step of generating control signals for controlling steering and/or acceleration of the host vehicle 1 to cause a longitudinal acceleration of the host vehicle 1 to approach the set target longitudinal acceleration. This process step may be performed by, for example, the target longitudinal acceleration setting module 14. Alternatively, the apparatus 10 may optionally include an additional module configured to generate the control signals for controlling steering and/or acceleration of the host vehicle 1 to cause a longitudinal acceleration of the host vehicle 1 to approach the set target longitudinal acceleration.

Alternatively, any other suitable entity in the host vehicle 1 may be provided with the target longitudinal acceleration determined by the target longitudinal acceleration setting module 14 and be configured to generate control signals for controlling steering and/or acceleration of the host vehicle 1 to cause a longitudinal acceleration of the host vehicle 1 to approach the determined target longitudinal acceleration. By way of example, the automatic driver system 15 shown in FIG. 1B may optionally be configured to generate control signals for controlling steering and/or acceleration of the host vehicle 1 to cause a longitudinal acceleration of the host vehicle 1 to approach the determined target longitudinal acceleration.

In the foregoing description, the functions of the apparatus 10 and the process of FIG. 4 are described in relation to a single leading vehicle only. However, this is non-limiting and for purposes of illustration only. The process performed by the apparatus 10 may take into account two or more leading vehicles by determining a respective target longitudinal acceleration for each of the two or more leading vehicles. The target longitudinal acceleration setting module 14 may, for example, then set the target longitudinal acceleration of the host vehicle 1 as the minimum acceleration (i.e. maximum deceleration) of the two or more respective target longitudinal accelerations determined.

Additionally or alternatively, the apparatus 10 may be configured carry out the process of FIG. 6 in order to determine a target longitudinal acceleration of the host vehicle 1 at a predefined periodicity or frequency, such that a new target longitudinal acceleration is determined for each period of time Δt. This period of time Δt may be referred to as a tick length and may be set equal to or less than $t_r$ (the host reaction(adaptation) time (s)) in order to ensure that the autonomously controlled host vehicle 1 will have sufficient time to react to any changes in its environment.

The example aspects described here avoid limitations, specifically rooted in computer technology, relating to the field of autonomous driving. By virtue of the example aspects described herein, it can be ensured that, even in cases where a leading vehicle does not drive safely and, for example, cuts into the lane in which the host vehicle is driving at an unsafe longitudinal distance, the target longitudinal acceleration set by the method according to the first aspect herein (or the apparatus according to the second apparatus herein) may change smoothly, thereby allowing that the host vehicle controlled in accordance with this acceleration avoids uncomfortable driving, such as sharp jerks, that does not resemble human-like driving. Also, by virtue of the foregoing capabilities of the example aspects described herein, which are rooted in computer technology, the example aspects described herein improve computers and computer processing/functionality, and also improve the field(s) of at least of autonomous driving and, in particular, the setting of a target longitudinal acceleration of a host vehicle relative to a road along which the host vehicle is travelling, for use in autonomous control of the host vehicle.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Software embodiments presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present disclosure have been described above, it should be understood that they have been presented by way of example, and not limitation. It will be apparent to persons skilled in the relevant art(s) that various changes in form and detail can be made therein. Thus, the above described example embodiments are not limiting.

While this specification contains many specific embodiment details, these should not be construed as limitations on the scope of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements and features discussed only in connection with one embodiment are not intended to be excluded from a similar role in other embodiments or embodiments.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

What is claimed is:

1. A computer-implemented method comprising:
   determining, based on a detected position of a leading vehicle relative to a host vehicle, a lateral position of a model of the leading vehicle in a model of a road on which the leading vehicle and the host vehicle are traveling, the road comprising a plurality of lanes;
   defining a lateral range extending from the model of the leading vehicle in the model of the road, the lateral range extending in a first lateral direction in the model of the road and a second lateral direction in the model of the road that is opposite to the first lateral direction, the lateral range comprising a first lateral subrange, a second lateral subrange, and a central lateral subrange between the first lateral subrange and the second lateral subrange,
   the lateral range defined to increase based on an increase of at least one of the first lateral subrange and the second lateral subrange with increasing distance between the determined lateral position of the model of the leading vehicle and a lateral position in the model of the road of a center of a lane among the plurality of lanes in which the model of the leading vehicle is located during a lane change by the model of the leading vehicle from the lane to an adjacent lane of the plurality of lanes;
   setting a longitudinal range extending from a rear of the model of the leading vehicle in a first longitudinal direction in the model of the road, the longitudinal range being set to a predetermined value;
   setting a target longitudinal acceleration of the host vehicle such that, for a longitudinal position of the model of the host vehicle that is within the longitudinal range, the target longitudinal acceleration of the host vehicle is set to:
      a respective first longitudinal acceleration value when a lateral position of the model of the host vehicle in the model of the road is within the central lateral subrange; and
      a respective second longitudinal acceleration value when the lateral position of the model of the host vehicle is within the first lateral subrange or the second lateral subrange, the respective second longitudinal acceleration value being greater than the first longitudinal acceleration value and dependent on the lateral position of the model of the host vehicle in the model of the road relative to the determined lateral position of the model of the leading vehicle; and
   autonomously controlling a speed of the vehicle using the set target longitudinal acceleration.

2. The method of claim 1, wherein the central lateral subrange has a fixed width that is based on a width of a bias region within a lane among the plurality of lanes, in which bias region the host vehicle is autonomously controlled to remain while travelling in the lane.

3. The method of claim 1, wherein the second longitudinal acceleration value varies from the first longitudinal acceleration value, when the lateral position of the model of the host vehicle is at a furthest edge in the second lateral direction of the first lateral subrange, to a third longitudinal acceleration value, when the lateral position of the model of the host vehicle is at a furthest edge in the first lateral direction of the first lateral subrange, the third longitudinal acceleration value being greater than the first longitudinal acceleration value.

4. The method of claim 3, wherein the second longitudinal acceleration value varies from the first longitudinal acceleration value, when the lateral position of the model of the host vehicle is at a furthest edge in the first lateral direction of the second lateral subrange, to a fourth longitudinal acceleration value when the lateral position of the model of the host vehicle is at a furthest edge in the second lateral direction of the second lateral subrange, the fourth longitudinal acceleration value being greater than the first longitudinal acceleration value.

5. The method of claim 1, further comprising setting the target longitudinal acceleration of the host vehicle to a fifth acceleration value, when the position of the model of the host vehicle is not in any of a first region of the model of the road defined by the longitudinal range and the central lateral subrange, a second region defined by the longitudinal range and the first lateral subrange, or a third region defined by the longitudinal range and the second lateral subrange.

6. The method of claim 1, wherein setting the target longitudinal acceleration of the host vehicle comprises scaling and offsetting a longitudinal acceleration, which has been determined by an adaptive cruise control algorithm, by an amount determined by evaluating a lateral scaling function that defines the lateral range and a variation of the factor across the lateral range such that, for a longitudinal position of a model of the host vehicle that is within the longitudinal range, the target longitudinal acceleration of the host vehicle is set to:
   the respective first longitudinal acceleration value when the lateral position of the model of the host vehicle is within the central lateral subrange; and
   the respective second longitudinal acceleration value when the lateral position of the model of the host vehicle is within the first lateral subrange or the second lateral subrange.

7. The method of claim 1, wherein:
   the target longitudinal acceleration of the host vehicle is set as a smaller of a predetermined acceleration value and an offset value;
   the offset value obtained by offsetting, by the predetermined acceleration value, a product of a value of the lateral scaling function and a difference value defined as a difference between a value of a longitudinal acceleration determined by an adaptive cruise control algorithm and the predetermined acceleration value; and
   the target longitudinal acceleration of the host vehicle is set effective to cause, for a longitudinal position of a model of the host vehicle that is within the longitudinal range, the target longitudinal acceleration of the host vehicle to be set to:
      a respective first longitudinal acceleration value when the lateral position of the model of the host vehicle is within the central lateral subrange; and
      a respective second longitudinal acceleration value when the lateral position of the model of the host vehicle is within the first lateral subrange or the second lateral subrange.

8. An apparatus comprising:
   a position determination module configured to determine, based on a detected position of a leading vehicle relative to a host vehicle, a lateral position of a model of the leading vehicle in a model of a road on which the leading vehicle and the host vehicle are traveling;

a lateral range defining module configured to define a lateral range extending from the model of the leading vehicle in the model of the road, the lateral range extending in a first lateral direction in the model of the road and a second lateral direction in the model of the road that is opposite to the first lateral direction, the lateral range comprising a first lateral subrange, a second lateral subrange and a central lateral subrange between the first lateral subrange, and the second lateral subrange, the lateral range defined to increase based on an increase of at least one of the first lateral subrange and the second lateral subrange with increasing distance between the determined lateral position of the model of the leading vehicle and a lateral position in the model of the road of a center of a lane among the plurality of lanes in which the model of the leading vehicle is located during a lane change by the model of the leading vehicle from the lane to an adjacent lane of the plurality of lanes;

a longitudinal range setting module configured to set a longitudinal range that extends from a rear of the model of the leading vehicle in a first longitudinal direction in the model of the road, the longitudinal range being set to a predetermined value;

a target longitudinal acceleration setting module configured to set the target longitudinal acceleration of the host vehicle such that, for a longitudinal position of a model of the host vehicle that is within the longitudinal range, the target longitudinal acceleration of the host vehicle is set to:

a respective first longitudinal acceleration value when a lateral position of the model of the host vehicle in the model of the road is within the central lateral subrange; and a respective second longitudinal acceleration value when the lateral position of the model of the host vehicle in the model of the road is within the first lateral subrange or the second lateral subrange, the second longitudinal acceleration value being greater than the first longitudinal acceleration value and dependent on a lateral position of the model of the host vehicle in the model of the road relative to the determined lateral position of the model of the leading vehicle; and an automatic driver system configured to autonomously control a speed of the vehicle using the set target longitudinal acceleration.

9. The apparatus of claim 8, wherein the central lateral subrange has a fixed width that is based on a width of a bias region within a lane among the plurality of lanes, in which bias region the host vehicle is autonomously controlled to remain while travelling in the lane.

10. The apparatus of claim 8, wherein the second longitudinal acceleration value varies from the first longitudinal acceleration value, when the lateral position of the model of the host vehicle is at a furthest edge in the second lateral direction of the first lateral subrange, to a third acceleration value, when the lateral position of the model of the host vehicle is at a furthest edge in the first lateral direction of the first lateral subrange, the third acceleration value being greater than the first longitudinal acceleration value.

11. The apparatus of claim 10, wherein the second longitudinal acceleration value varies from the first longitudinal acceleration value, when the lateral position of the model of the host vehicle is at a furthest edge in the first lateral direction of the second lateral subrange, to a fourth acceleration value when the lateral position of the model of the host vehicle is at a furthest edge in the second lateral direction of the second lateral subrange, the fourth acceleration value being greater than the first longitudinal acceleration value.

12. The apparatus of claim 8, wherein the target longitudinal acceleration setting module is arranged to set the target longitudinal acceleration of the host vehicle to a fifth acceleration value when the position of the model of the host vehicle is not in any of the first region of the model of the road defined by the longitudinal range and the central lateral subrange.

13. The apparatus of claim 8, wherein the target longitudinal acceleration setting module is configured to set the target longitudinal acceleration of the host vehicle by scaling and offsetting a longitudinal acceleration, which has been determined by an adaptive cruise control algorithm, by an amount determined by evaluating a lateral scaling function that defines the lateral range and a variation of the factor across the lateral range such that, for a longitudinal position of a model of the host vehicle that is within the longitudinal range, the target longitudinal acceleration of the host vehicle is set to:

the respective first longitudinal acceleration value when the lateral position of the model of the host vehicle is within the central lateral subrange; and the respective second longitudinal acceleration value when the lateral position of the model of the host vehicle is within the first lateral subrange or the second lateral subrange.

14. The apparatus of claim 8, wherein:

the target longitudinal acceleration of the host vehicle is set as a smaller of a predetermined acceleration value and an offset value;

the offset value obtained by offsetting, by the predetermined acceleration value, a product of a value of the lateral scaling function and a difference value defined as a difference between a value of a longitudinal acceleration determined by an adaptive cruise control algorithm and the predetermined acceleration value; and the target longitudinal acceleration of the host vehicle is set effective to cause, for a longitudinal position of a model of the host vehicle that is within the longitudinal range, the target longitudinal acceleration of the host vehicle to be set to:

a respective first longitudinal acceleration value when the lateral position of the model of the host vehicle is within the central lateral subrange; and a respective second longitudinal acceleration value when the lateral position of the model of the host vehicle is within the first lateral subrange or the second lateral subrange.

15. A vehicle comprising:

a position determination apparatus for determining a position of a second vehicle relative to the vehicle;

an apparatus configured to:

determine, based on the position of the second vehicle, a lateral position of a model of the vehicle in a model of a road on which the second vehicle and the vehicle are traveling;

define a lateral range extending from the model of the second vehicle in the model of the road, the lateral range extending in a first lateral direction in the model of the road and a second lateral direction in the model of the road that is opposite to the first lateral direction, the lateral range comprising a first lateral subrange, a second lateral subrange and a central lateral subrange between the first lateral subrange, and the second lateral subrange, the lateral range defined to increase based on an increase of at least one of the first lateral subrange and the second lateral subrange with increasing distance between the determined lateral position of the model of the second vehicle and a lateral position in the model of the road of a center of a lane among the plurality of lanes in which the model of the second vehicle is located during a lane change by the model of the second vehicle from the lane to an adjacent lane of the plurality of lanes;

set a longitudinal range that extends from a rear of the model of the second vehicle in a first longitudinal direction in the model of the road, the longitudinal range being set to a predetermined value;

set the target longitudinal acceleration of the vehicle using the determined position of the second vehicle, the target longitudinal acceleration of the vehicle set such that, for a longitudinal position of a model of the vehicle that is within the longitudinal range, the target longitudinal acceleration of the vehicle is set to:

a respective first longitudinal acceleration value when a lateral position of the model of the vehicle in the model of the road is within the central lateral subrange; and a respective second longitudinal acceleration value when the lateral position of the model of the vehicle in the model of the road is within the first lateral subrange or the second lateral subrange, the second longitudinal acceleration value being greater than the first longitudinal acceleration value and dependent on a lateral position of the model of the vehicle in the model of the road relative to the determined lateral position of the model of the second vehicle; and an automatic driver system configured to autonomously control a speed of the vehicle using the set target longitudinal acceleration.

16. The vehicle of claim 15, wherein the central lateral subrange has a fixed width that is based on a width of a bias region within a lane among the plurality of lanes, and wherein the host vehicle is autonomously controlled to remain in the bias region while travelling in the lane.

17. The vehicle of claim 15, wherein the second longitudinal acceleration value varies from the first longitudinal acceleration value, when the lateral position of the model of the vehicle is at a furthest edge in the second lateral direction of the first lateral subrange, to a third acceleration value, when the lateral position of the model of the vehicle is at a furthest edge in the first lateral direction of the first lateral subrange, the third acceleration value being greater than the first longitudinal acceleration value.

18. The vehicle of claim 17, wherein the second longitudinal acceleration value varies from the first longitudinal acceleration value, when the lateral position of the model of the host vehicle is at a furthest edge in the first lateral direction of the second lateral subrange, to a fourth acceleration value when the lateral position of the model of the host vehicle is at a furthest edge in the second lateral direction of the second lateral subrange, the fourth acceleration value being greater than the first longitudinal acceleration value.

19. The vehicle of claim 16, wherein the target longitudinal acceleration of the vehicle is set to a fifth acceleration value when the position of the model of the vehicle is not in any of the first region of the model of the road defined by the longitudinal range and the central lateral subrange.

20. The vehicle of claim 16, wherein the target longitudinal acceleration of the vehicle is set based on scaling and offsetting a longitudinal acceleration, which has been determined by an adaptive cruise control algorithm, by an amount determined by evaluating a lateral scaling function that defines the lateral range and a variation of the factor across the lateral range such that, for a longitudinal position of a model of the vehicle that is within the longitudinal range, the target longitudinal acceleration of the vehicle is set to:

the respective first longitudinal acceleration value when the lateral position of the model of the vehicle is within the central lateral subrange; and the respective second longitudinal acceleration value when the lateral position of the model of the vehicle is within the first lateral subrange or the second lateral subrange.

* * * * *